(12) United States Patent
Cui et al.

(10) Patent No.: US 9,041,690 B2
(45) Date of Patent: May 26, 2015

(54) CHANNEL WAVEGUIDE SYSTEM FOR SENSING TOUCH AND/OR GESTURE

(75) Inventors: Xiquan Cui, San Jose, CA (US); Russell Wayne Gruhlke, Milpitas, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 178 days.

(21) Appl. No.: 13/567,987

(22) Filed: Aug. 6, 2012

(65) Prior Publication Data

US 2014/0035836 A1  Feb. 6, 2014

(51) Int. Cl.
*G06F 3/042* (2006.01)

(52) U.S. Cl.
CPC .... *G06F 3/0421* (2013.01); *G06F 2203/04109* (2013.01)

(58) Field of Classification Search
CPC .............. G06F 2203/04109; G06F 3/0421
USPC ............... 345/173–183; 178/18.09, 18.11
See application file for complete search history.

(56) References Cited

U.S. PATENT DOCUMENTS

| | | | |
|---|---|---|---|
| 8,144,271 B2 | 3/2012 | Han | |
| 2008/0029691 A1 | 2/2008 | Han et al. | |
| 2010/0097348 A1* | 4/2010 | Park et al. | 345/175 |
| 2010/0103140 A1* | 4/2010 | Hansson | 345/175 |
| 2010/0156848 A1* | 6/2010 | Yatsuda et al. | 345/175 |
| 2010/0187422 A1* | 7/2010 | Kothari et al. | 250/353 |
| 2010/0295821 A1* | 11/2010 | Chang et al. | 345/175 |
| 2010/0315413 A1 | 12/2010 | Izadi et al. | |
| 2011/0122091 A1 | 5/2011 | King et al. | |
| 2011/0157093 A1* | 6/2011 | Bita et al. | 345/175 |
| 2011/0175920 A1 | 7/2011 | Ieperen | |
| 2011/0216042 A1* | 9/2011 | Wassvik et al. | 345/175 |
| 2011/0221705 A1* | 9/2011 | Yi et al. | 345/175 |
| 2011/0234537 A1 | 9/2011 | Kim et al. | |
| 2011/0273394 A1* | 11/2011 | Young et al. | 345/174 |
| 2012/0146952 A1* | 6/2012 | Park et al. | 345/175 |
| 2012/0182266 A1* | 7/2012 | Han | 345/175 |
| 2013/0157729 A1* | 6/2013 | Tabe | 455/573 |

OTHER PUBLICATIONS

International Search Report and Written Opinion—PCT/US2013/053581—ISA/EPO—Nov. 11, 2013.
Pedersen et al. "Optical touch screen based on waveguide sensing." Applied Physics Letters [Online] 2011, vol. 99, Issue 6, pp. 1-3.

\* cited by examiner

*Primary Examiner* — Hong Zhou
(74) *Attorney, Agent, or Firm* — Weaver Austin Villeneuve & Sampson LLP

(57) ABSTRACT

This disclosure relates to a channel waveguide, at least a portion of which is disposed within a viewing area of an interactive display, proximate to and substantially parallel to a user interface surface of the interactive display. A source of a first electromagnetic or acoustic signal is input to the channel waveguide. At least one detector is configured to receive, from the channel waveguide, a second signal corresponding to the first signal and to output a third signal indicative of a position of an object proximate to the channel waveguide.

17 Claims, 21 Drawing Sheets

| | Common Voltages | | | | |
|---|---|---|---|---|---|
| Segment Voltages | $VC_{ADD\_H}$ | $VC_{HOLD\_H}$ | $VC_{REL}$ | $VC_{HOLD\_L}$ | $VC_{ADD\_L}$ |
| $VS_H$ | Stable | Stable | Relax | Stable | Actuate |
| $VS_L$ | Actuate | Stable | Relax | Stable | Stable |

View AA

View BB

View DD

CHANNEL WAVEGUIDE SYSTEM FOR SENSING TOUCH AND/OR GESTURE

TECHNICAL FIELD

This disclosure relates generally to an interactive display, and, more specifically, to an interactive display with a channel waveguide, the interactive display providing a user input/output interface that senses and locates the position of a user's touch and/or gesture.

DESCRIPTION OF THE RELATED TECHNOLOGY

Electromechanical systems (EMS) include devices having electrical and mechanical elements, actuators, transducers, sensors, optical components (such as mirrors and optical film layers) and electronics. EMS can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term IMOD or interferometric light modulator refers to a device that selectively absorbs and/or reflects light using the principles of optical interference. In some implementations, an IMOD may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the IMOD. IMOD devices have a wide range of applications, and are anticipated to be used in improving existing products and creating new products, especially those with display capabilities, such as personal computers and personal electronic devices (PED's).

Increasingly, electronic devices such as personal computers and PED's provide for at least some user inputs to be provided by means other than physical buttons, keyboards, and point and click devices. For example, touchscreen displays are increasingly relied upon for common user input functions. Although a number of touchscreen technologies are relatively mature, the power demand, cost, durability and reliability of known techniques present barriers to use and/or undermine user satisfaction. For example, "electronic-touch" devices such as resistive, capacitive, and projected capacitive touch (PCT) screens generally employ transparent layers of indium tin oxide (ITO) stacked together and separated by a thin space. The ITO layers are relatively costly, tend to degrade screen clarity, and may have poor durability. Moreover, the power consumption of PCT screens scales up as the display area is increased, due to the resistance of ITO.

"Optical-touch" screens avoid the need for ITO layers, and are generally more transparent than electronic-touch devices, but known optical-touch systems are unsatisfactorily complex, and require numerous components that must be carefully aligned and consume appreciable amounts of power.

SUMMARY

The systems, methods and devices of the disclosure each have several innovative aspects, no single one of which is solely responsible for the desirable attributes disclosed herein.

One innovative aspect of the subject matter described in this disclosure includes an apparatus or electronic device that cooperates with an interactive display to provide an input/output (I/O) interface to a user of the apparatus. The interactive display has a front surface that includes a viewing area. The electronic device may include the interactive display or be electrically or wirelessly coupled to the interactive display. The apparatus may include a processor, a channel waveguide, a source of a first electromagnetic or acoustic signal input to the channel waveguide, and at least one detector. At least a portion of the channel waveguide may be disposed within the viewing area, proximate to and substantially parallel to the user interface surface. The processor may be configured to receive a third signal output by the at least one detector, and determine, from the third signal, a position of an object proximate to the channel waveguide.

In an implementation, the object may include one or more of a hand, finger, hand held object, and other object under control of the user.

In a further implementation an apparatus includes at least one channel waveguide, a source of a first signal input to the channel waveguide, and at least one detector. At least a portion of the channel waveguide may be disposed within a viewing area of an interactive display, proximate to and substantially parallel to a user interface surface of the interactive display. The detector may be configured to receive, from the channel waveguide, a second signal corresponding to the first signal, and to output a third signal indicative of a position of an object proximate to the channel waveguide.

In an embodiment, the at least one channel waveguide may be disposed in a serpentine or spiral configuration. The at least one channel waveguide may include a plurality of channel waveguides forming a network of waveguides.

In an implementation, each channel waveguide may be substantially straight and parallel. In another implementation, at least one channel waveguide may be curved, non-parallel to at least one other channel waveguide in the network, or both.

In an implementation, the plurality of channel waveguides may be disposed in a rectilinear grid.

In yet a further implementation, the channel waveguide may include at least one light turning device that outputs reflected light, in a direction having a substantial component orthogonal to the user interface surface, by reflecting emitted light received from the source. The channel waveguide may be configured to collect scattered light, the collected scattered light resulting from interaction of the reflected light with an object. The light turning device may redirect the collected scattered light toward the at least one detector. Each detector may be configured to output, to the processor, a signal representative of a characteristic of the redirected collected scattered light. The signal may be usable in recognition of an instance of a user gesture.

In an implementation, the light turning device may include one or more of a microstructure or a grating.

In a further implementation, the first signal may include only scattered light received by the channel waveguide from the object, the scattered light resulting from interaction of the object with one or more of ambient light and a display light.

In an implementation, the apparatus may include a light-emitting source disposed outside the periphery of the planar light guide, the light-emitting source being optically coupled with an input to the channel waveguide.

In an implementation, the interactive display may be flexible. In another implementation the interactive display may be non-planar. In a further implementation the interactive display may be both non-planar and flexible.

In an implementation, the source of the first input signal may be an electromagnetic signal source or an acoustic signal source.

In an implementation, the apparatus may include the interactive display, the interactive display including the user interface surface, and a processor configured to receive the third signal, and determine, from the third signal, a position of an object proximate to the channel waveguide, wherein the processor is configured to control one or both of the interactive display and an electronic device associated with the display, responsive to the position determination. The processor may be configured to determine the position of the object based, at least in part, on fly time of the signal. The processor may be configured to process image data, and the apparatus may further include a memory device that is configured to communicate with the processor. A driver circuit may be configured to send at least one signal to the interactive display. A controller may be configured to send at least a portion of the image data to the driver circuit. The apparatus may further include an image source module configured to send the image data to the processor. The image source module may include one or more of a receiver, transceiver, and transmitter. The apparatus may further include an input device configured to receive input data and to communicate the input data to the processor.

Details of one or more implementations of the subject matter described in this specification are set forth in the accompanying drawings and the description below. Although the examples provided in this summary are primarily described in terms of MEMS-based displays, the concepts provided herein apply to other types of displays, such as organic light-emitting diode ("OLED") displays and field emission displays. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
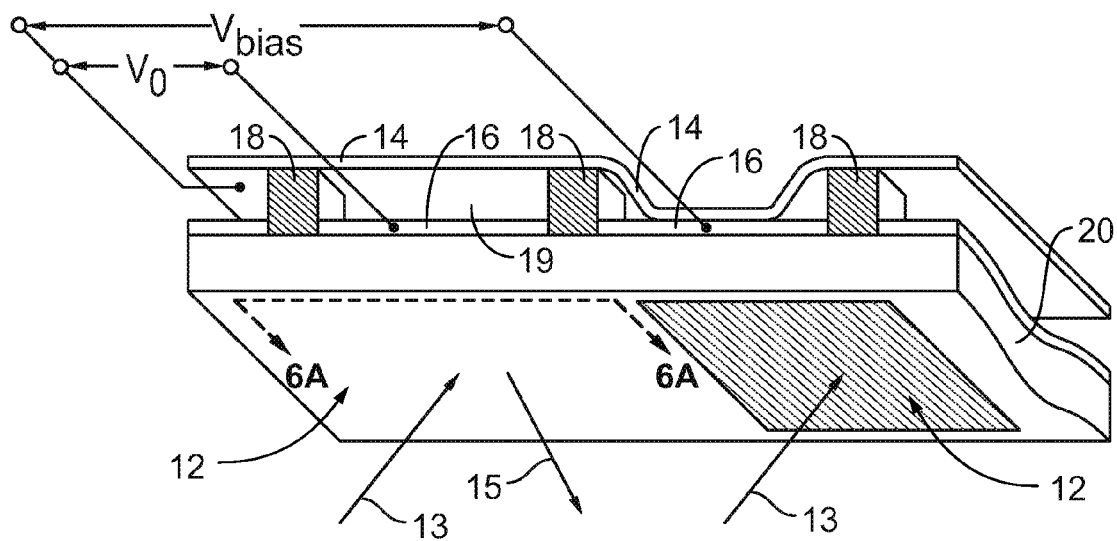
FIG. 1 shows an example of an isometric view depicting two adjacent pixels in a series of pixels of an interferometric modulator (IMOD) display device.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to display an image, whether in motion (e.g., video) or stationary (e.g., still image), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (i.e., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS), microelectromechanical systems (MEMS) and non-MEMS applications), aesthetic structures (e.g., display of images on a piece of jewelry) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Described herein are new techniques for providing, on an interactive display, a user input/output (I/O) interface for an electronic device. The interactive display may be configured to effectuate the I/O interface, in response to a user's touch or gesture, made proximate to a viewing area and/or user interface surface of the interactive display. In some implementations, the interactive display may be a "touchscreen" display. The presently disclosed apparatus, however, may be configured to detect a presence of an object disposed a finite distance from the user interface surface, so that a position of the object may be sensed without an actual physical "touching" of the user interface surface. Moreover, a "touch," as used herein, may include short duration and/or high frequency "tap-like" interactions of the object with the user interface surface. "Gesture" as used herein broadly refers to a gross motion of a user's hand, digit, or hand-held object, or other object under control of the user. The motion may be made proximate to, but not necessarily in direct physical contact with, the electronic device. In some implementations, the electronic device senses and reacts in a deterministic way to a user's touch and/or gesture.

The interactive display, advantageously, may include one or more channel waveguides disposed within the viewing area, proximate to and substantially parallel to the user interface surface. Signals propagated through the channel waveguides may be analyzed to determine a position of an object proximate to the channel waveguide.

Particular implementations of the subject matter described in this disclosure can be implemented to realize one or more of the following potential advantages. Excellent display quality may be maintained because of the small diameter and transparency of the channel waveguides. Power consumption may be reduced because signals propagate through the waveguides with very small losses. Excellent immunity to noise generated by ambient light and/or other electromagnetic radiation is achieved because the channel waveguide may propagate light in an evanescent state, and environmental noise is substantially prevented from propagating into the channel waveguide. The channel waveguides, which may be glass or plastic, may be economically fabricated on a plastic or glass display substrate by, for example, micromachining, embossing or lamination processes. Because the display substrate, and waveguides fabricated thereon, may be flexible and/or non-planar, application to a wide variety of devices and systems is possible.

Although much of the description herein pertains to IMOD displays, many such implementations could be used to advantage in other types of reflective displays, including but not limited to electrophoretic ink displays and displays based on electrowetting technology. Moreover, while the IMOD displays described herein generally include red, blue and green pixels, many implementations described herein could be used in reflective displays having other colors of pixels, such as having violet, yellow-orange and yellow-green pixels. Moreover, many implementations described herein could be used in reflective displays having more colors of pixels, such as having pixels corresponding to 4, 5, or more colors. Some such implementations may include pixels corresponding to red, blue, green and yellow. Alternative implementations may include pixels corresponding to at least red, blue, green, yellow and cyan.

An example of a suitable device, to which the described implementations may apply, is a reflective EMS or MEMS-based display device. Reflective display devices can incorporate IMODs to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the IMOD. The reflectance spectrums of IMODs can create fairly broad spectral bands which can be shifted across the visible wavelengths to generate different colors. The position of the spectral band can be adjusted by changing the thickness of the optical resonant cavity. One way of changing the optical resonant cavity is by changing the position of the reflector.

FIG. 1 shows an example of an isometric view depicting two adjacent pixels in a series of pixels of an IMOD display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, absorbing and/or destructively interfering light within the visible range. In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent IMODs 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, such as chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and electrical conductor, while different, electrically more conductive layers or portions (e.g., of the optical stack 16 or of other structures of the IMOD) can serve to bus signals between IMOD pixels. The optical stack 16 also can include one or more insulating or dielectric layers covering one or more conductive layers or an electrically conductive/optically absorptive layer.

In some implementations, the layer(s) of the optical stack 16 can be patterned into parallel strips, and may form row electrodes in a display device as described further below. As will be understood by one having ordinary skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be approximately less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, a voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
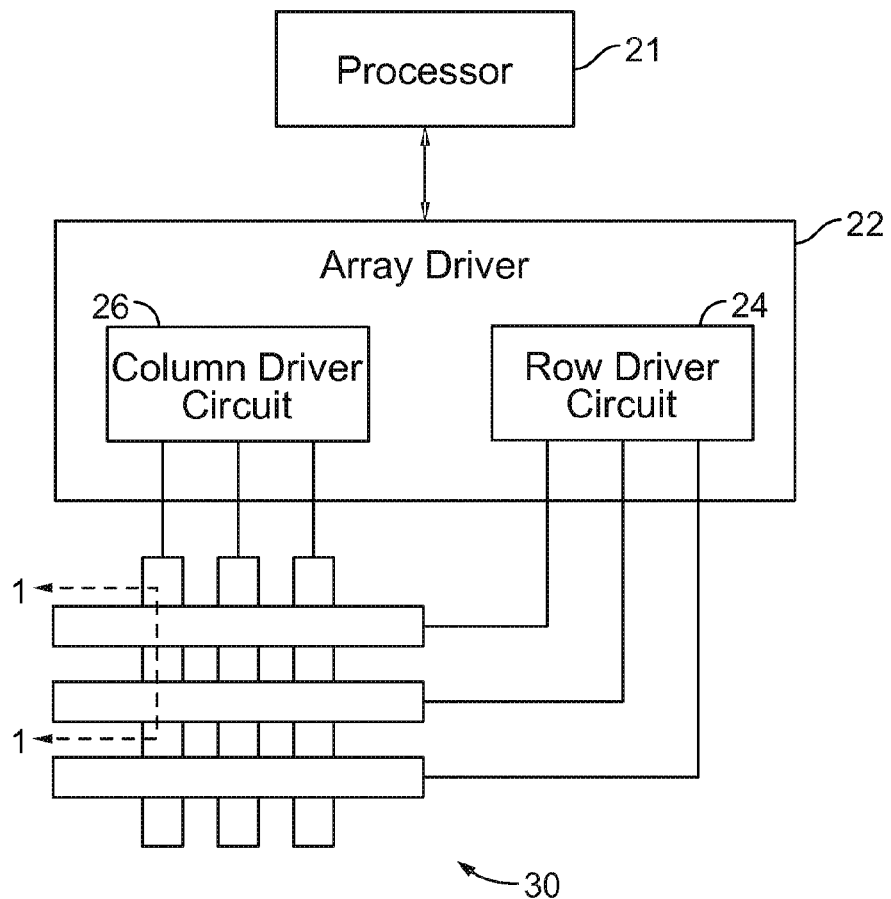
FIG. 2 shows an example of a system block diagram illustrating an electronic device incorporating a 3×3 IMOD display.

FIG. 2 shows an example of a system block diagram illustrating an electronic device incorporating a 3×3 IMOD display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, for example, a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
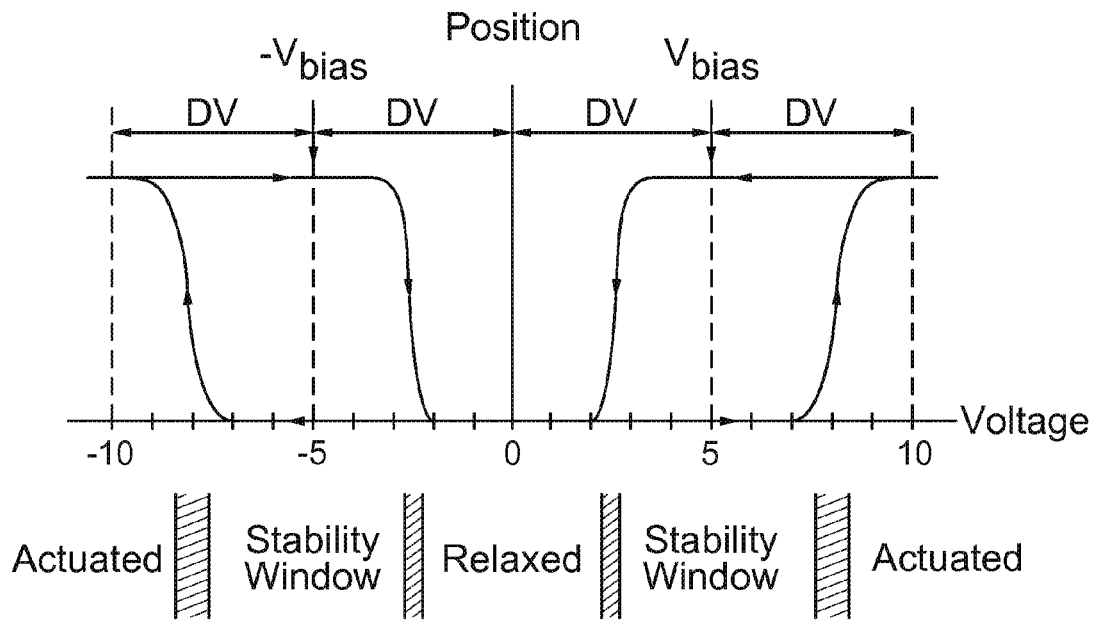
FIG. 3 shows an example of a diagram illustrating movable reflective layer position versus applied voltage for the IMOD of FIG. 1.
FIG. 4 shows an example of a table illustrating various states of an IMOD when various common and segment voltages are applied.

FIG. 3 shows an example of a diagram illustrating movable reflective layer position versus applied voltage for the IMOD of FIG. 1. For MEMS IMODs, the row/column (i.e., common/segment) write procedure may take advantage of a hysteresis property of these devices as illustrated in FIG. 3. An IMOD may use, in one example implementation, about a 10-volt potential difference to cause the movable reflective layer, or mirror, to change from the relaxed state to the actuated state. When the voltage is reduced from that value, the movable reflective layer maintains its state as the voltage drops back below, in this example, 10 volts; however, the movable reflective layer does not relax completely until the voltage drops below 2 volts. Thus, a range of voltage, approximately 3 to 7 volts, in this example, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about, in this example, 10 volts, and pixels that are to be relaxed are exposed to a voltage difference of near zero volts. After addressing, the pixels can be exposed to a steady state or bias voltage difference of approximately 5 volts in this example, such that they remain in the previous strobing state. In this example, after being addressed, each pixel sees a potential difference within the "stability window" of about 3-7 volts. This hysteresis property feature enables the pixel design, such as that illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an IMOD when various common and segment voltages are applied. As will be understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all IMOD elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator pixels (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the IMOD will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which produce the same polarity potential difference across the modulators. In some other implementations, signals can be used which alternate the polarity of the potential difference of the modulators from time to time. Alternation of the polarity across the modulators (that is, alternation of the polarity of write procedures) may reduce or inhibit charge accumulation which could occur after repeated write operations of a single polarity.

Figure 5A:
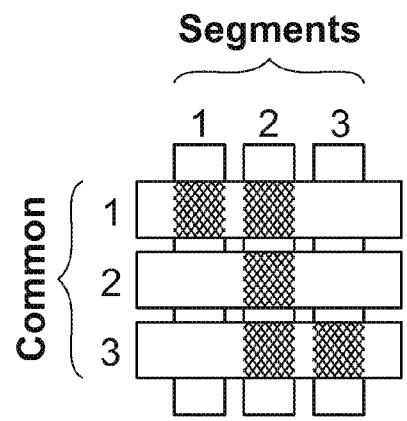
FIG. 5A shows an example of a diagram illustrating a frame of display data in the 3×3 IMOD display of FIG. 2.
Figure 5B:
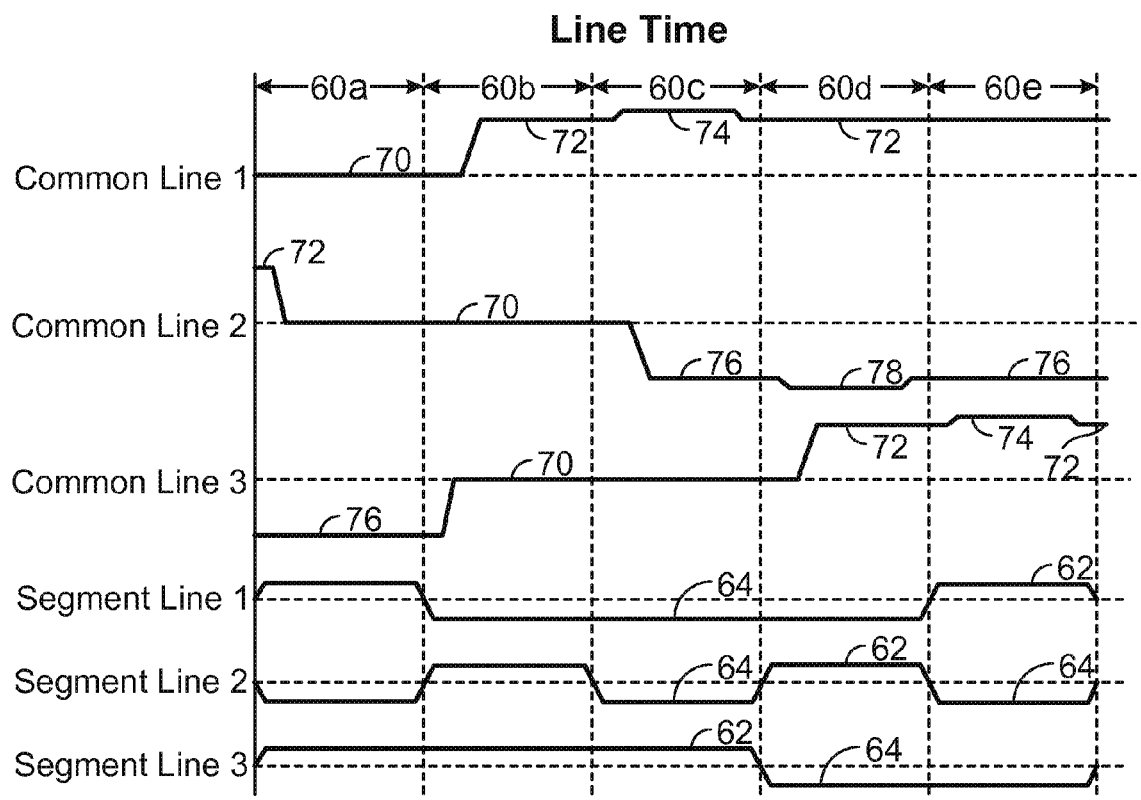
FIG. 5B shows an example of a timing diagram for common and segment signals that may be used to write the frame of display data illustrated in FIG. 5A.

FIG. 5A shows an example of a diagram illustrating a frame of display data in the 3×3 IMOD display of FIG. 2. FIG. 5B shows an example of a timing diagram for common and segment signals that may be used to write the frame of display data illustrated in FIG. 5A. The signals can be applied to a 3×3 array, similar to the array of FIG. 2, which will ultimately result in the line time 60e display arrangement illustrated in FIG. 5A. The actuated modulators in FIG. 5A are in a darkstate, i.e., where a substantial portion of the reflected light is outside of the visible spectrum so as to result in a dark appearance to, for example, a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the IMODs, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
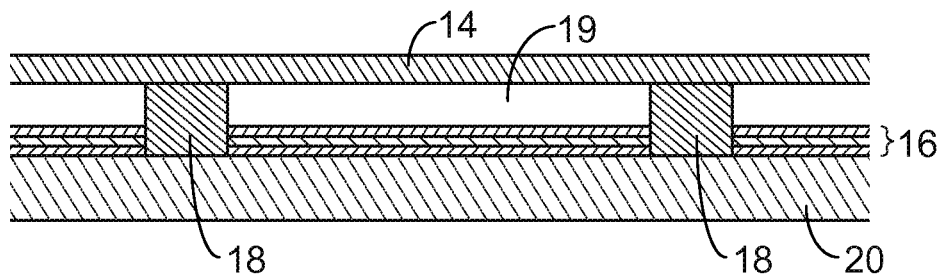
FIG. 6A shows an example of a partial cross-section of the IMOD display of FIG. 1.
Figure 6B:
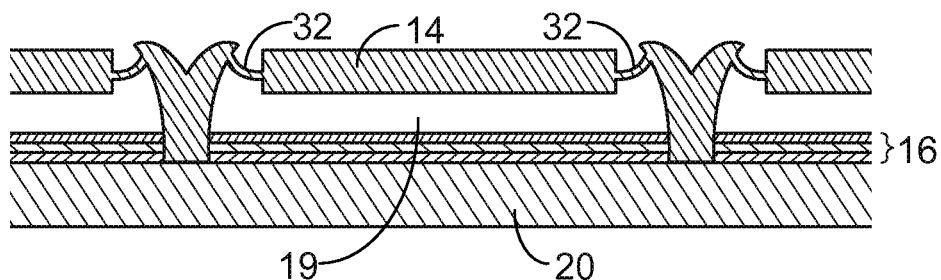
FIGS. 6B-6E show examples of cross-sections of varying implementations of IMODs.
Figure 6C:
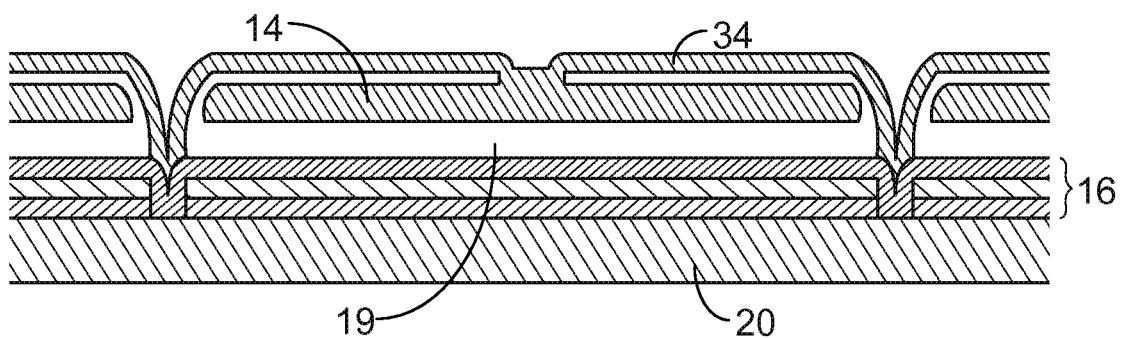

The details of the structure of IMODs that operate in accordance with the principles set forth above may vary widely. For example, FIGS. 6B-6E show examples of cross-sections of varying implementations of IMODs, including the movable reflective layer 14 and its supporting structures. FIG. 6A shows an example of a partial cross-section of the IMOD display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
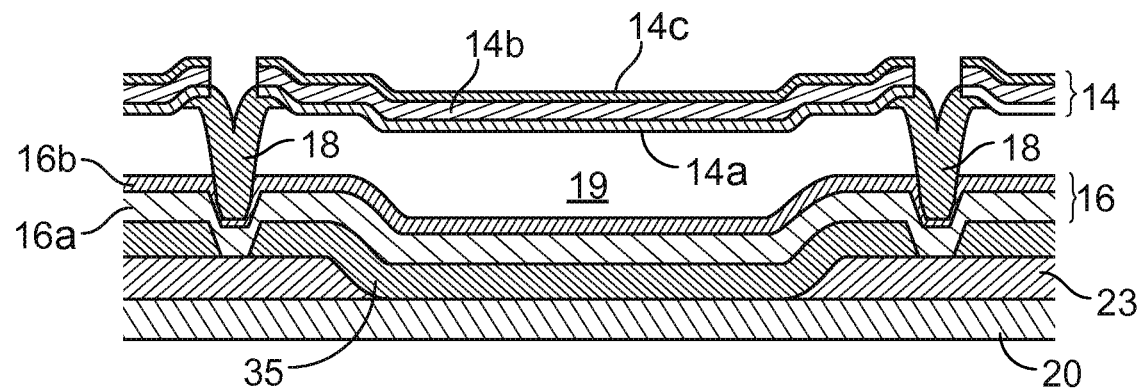

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide (SiO$_2$). In some implementations, the support layer 14b can be a stack of layers, such as, for example, a SiO$_2$/SiON/SiO$_2$ tri-layer stack. Either or both of the reflective sub-layer 14a and the conductive layer 14c can include, for example, an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (such as between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoromethane (CF$_4$) and/or oxygen (O$_2$) for the MoCr and SiO$_2$ layers and chlorine (Cl$_2$) and/or boron trichloride (BCl$_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
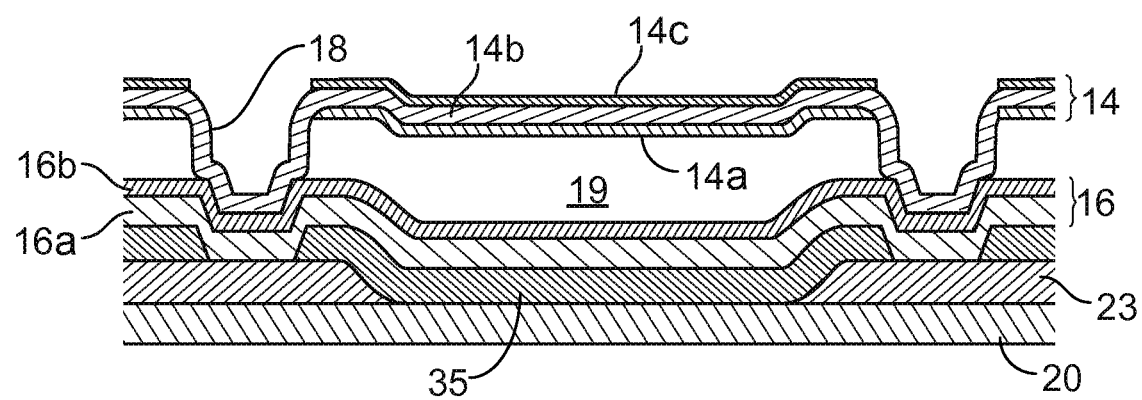

FIG. 6E shows another example of an IMOD, where the movable reflective layer 14 is self-supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the IMOD is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer. In some implementations, the optical absorber 16a is an order of magnitude (ten times or more) thinner than the movable reflective layer 14. In some implementations, optical absorber 16a is thinner than reflective sub-layer 14a.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as patterning.

Figure 7:
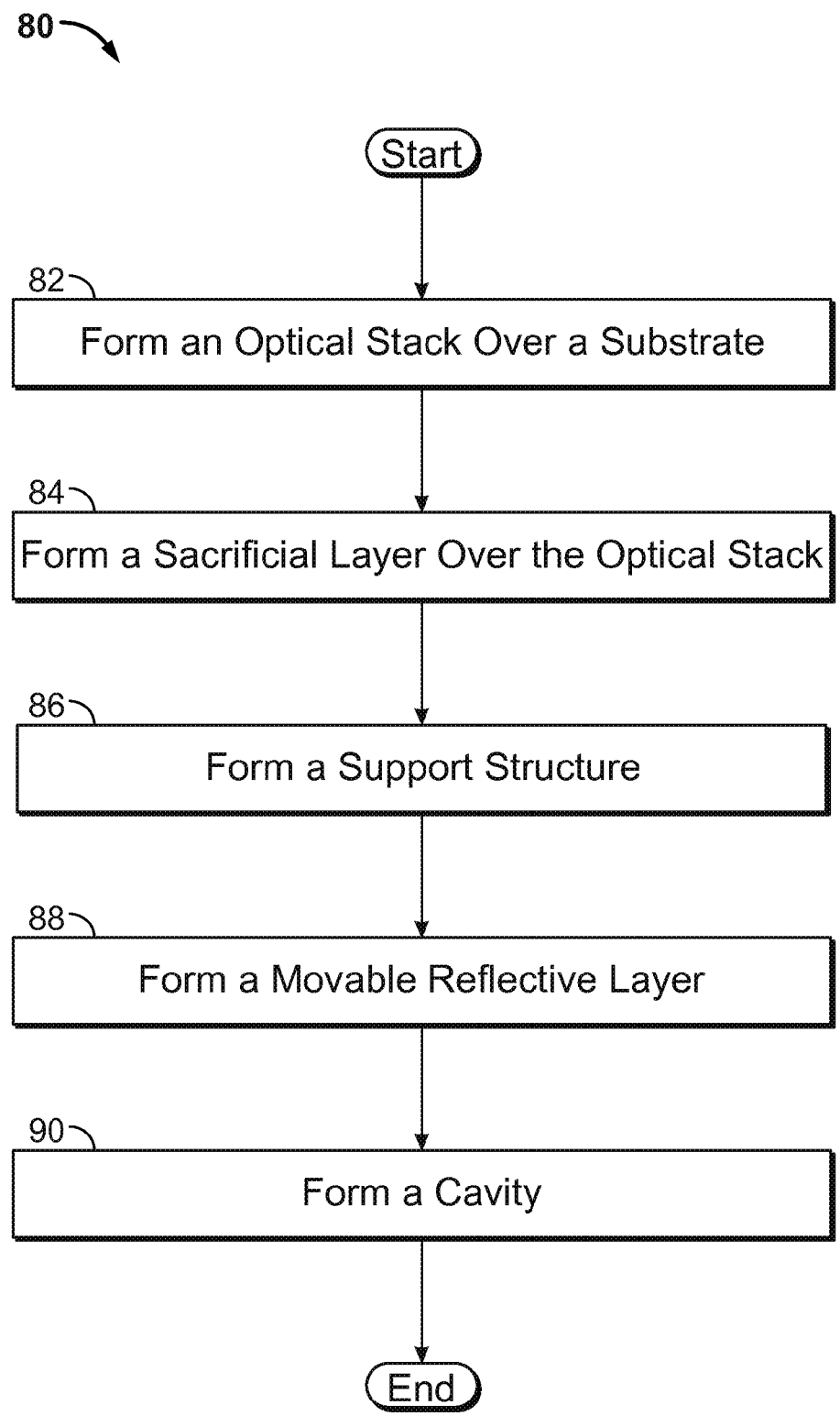
FIG. 7 shows an example of a flow diagram illustrating a manufacturing process for an IMOD.
Figure 8A:
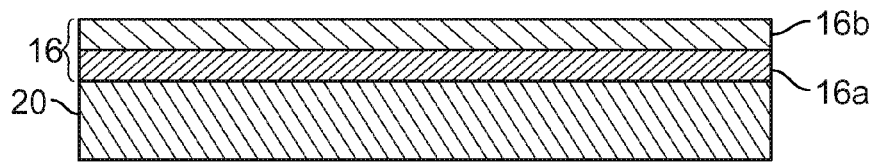
FIGS. 8A-8E show examples of cross-sectional schematic illustrations of various stages in a method of making an IMOD.

FIG. 7 shows an example of a flow diagram illustrating a manufacturing process 80 for an IMOD, and FIGS. 8A-8E show examples of cross-sectional schematic illustrations of corresponding stages of such a manufacturing process 80. In some implementations, the manufacturing process 80 can be implemented to manufacture an electromechanical systems device such as IMODs of the general type illustrated in FIGS. 1 and 6. The manufacture of an electromechanical systems device also can include other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, such as cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a and 16b can be configured with both optically absorptive and electrically conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display. It is noted that FIGS. 8A8E may not be drawn to scale. For example, in some implementations, one of the sub-layers of the optical stack, the optically absorptive layer, may be very thin, although sub-layers 16a, 16b are shown somewhat thick in FIGS. 8A-8E.

Figure 8B:
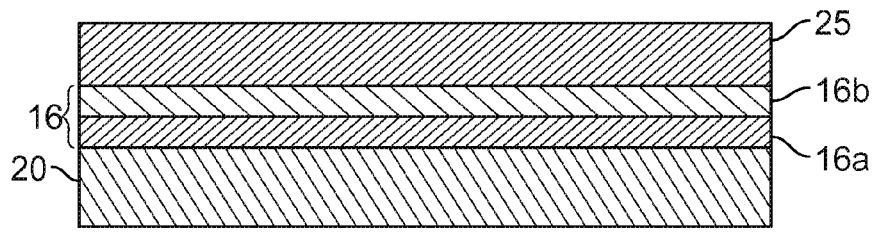

The process 80 continues at block 84 with the formation of a sacrificial layer 25 over the optical stack 16. The sacrificial layer 25 is later removed (see block 90) to form the cavity 19 and thus the sacrificial layer 25 is not shown in the resulting IMODs 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (a-Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, which includes many different techniques, such as sputtering), plasma-enhanced chemical vapor deposition (PECVD), thermal chemical vapor deposition (thermal CVD), or spin-coating.

Figure 8C:
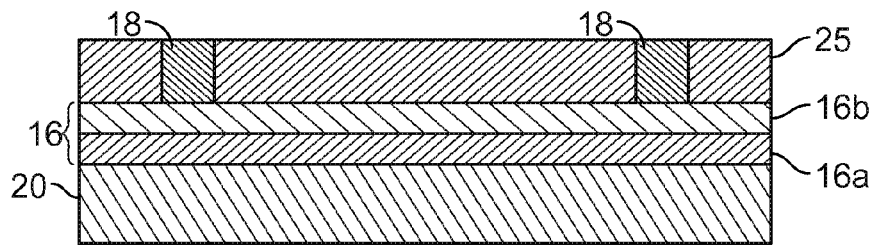

The process 80 continues at block 86 with the formation of a support structure such as post 18, illustrated in FIGS. 1, 6 and 8C. The formation of the post 18 may include patterning the sacrificial layer 25 to form a support structure aperture, then depositing a material (such as a polymer or an inorganic material such as silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
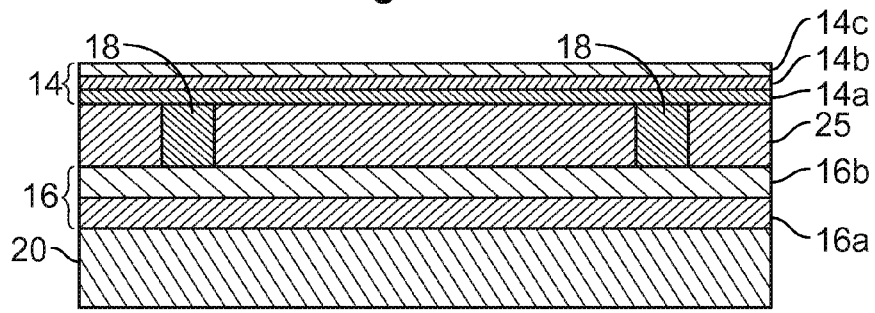
Figure 8E:
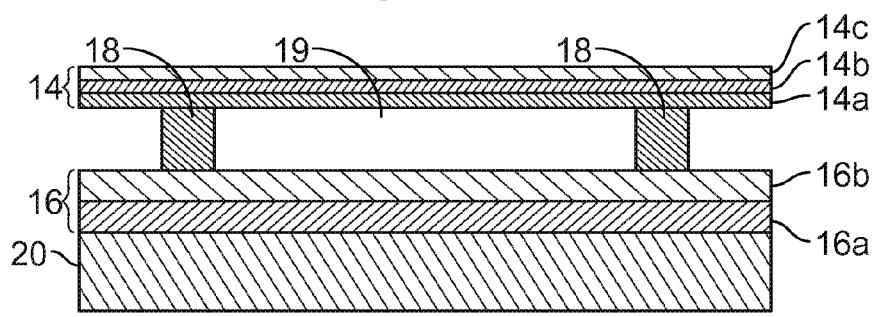

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps including, for example, reflective layer (such as aluminum, aluminum alloy, or other reflective layer) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated IMOD formed at block 88, the movable reflective layer 14 is typically not movable at this stage. A partially fabricated IMOD that contains a sacrificial layer 25 also may be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, such as cavity 19 illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, by exposing the sacrificial layer 25 to a gaseous or vaporous etchant, such as vapors derived from solid $XeF_2$, for a period of time that is effective to remove the desired amount of material. The sacrificial material is typically selectively removed relative to the structures surrounding the cavity 19. Other etching methods, such as wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Figure 9A:
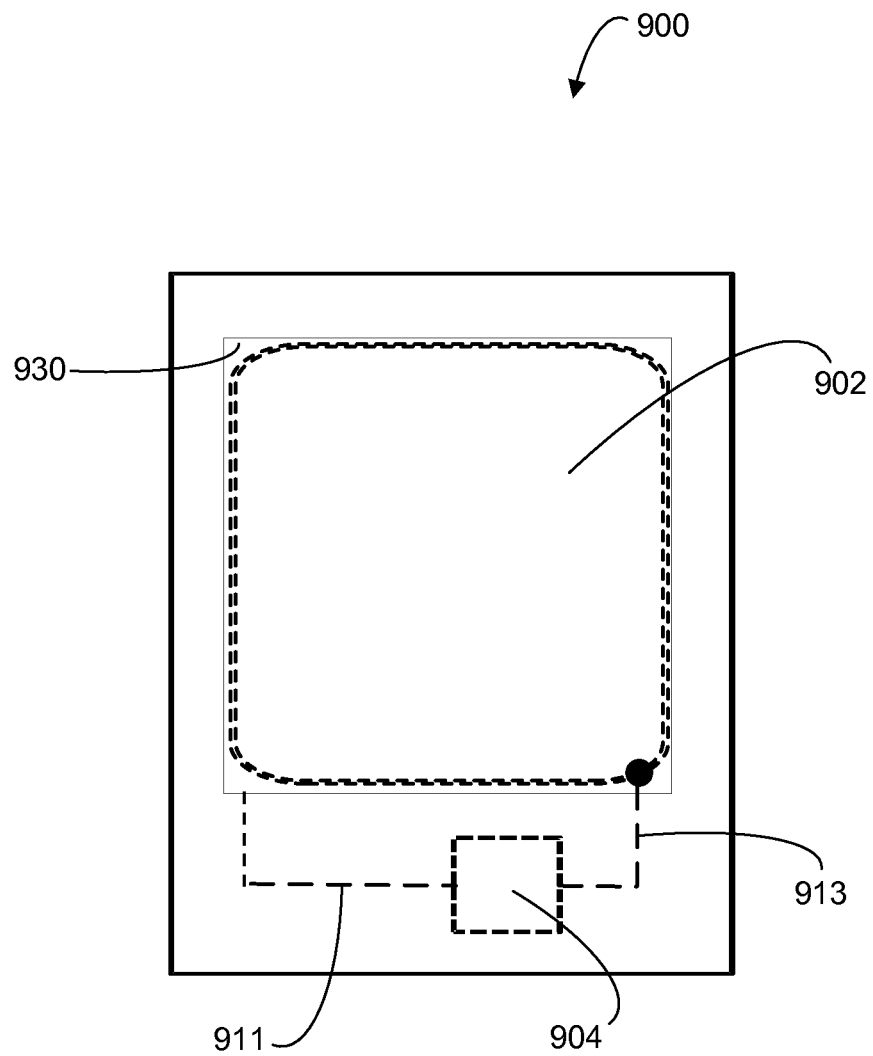
FIG. 9A shows an example of a block diagram of an electronic device having an interactive display according to one implementation.

FIG. 9A shows an example of a block diagram of an electronic device having an interactive display according to one implementation. Electronic device 900, which may be, for example a personal electronic device, may include interactive display 902 and processor 904. Interactive display 902 may be a touchscreen display, for example. Interactive display 902 may be configured as an IMOD display, or other type of display, such as plasma, electroluminescent (EL), organic light emitting diode (OLED), super twisted numatic (STN) or thin film transistor (TFT) liquid crystal display (LCD), or a non-flat-panel display, such as a CRT or other tube device. Processor 904 may be configured to control an output of interactive display 902, responsive, at least in part, to user inputs, which may include touch or gestures by a user's appendage, such as a finger, a hand or a handheld object (e.g., a stylus) or the like.

Arrangement 930 (examples of which are described and illustrated herein below) may be disposed proximate to and substantially parallel to a user interface surface of interactive display 902. In an implementation, arrangement 930 may be substantially transparent. Moreover, in an implementation, arrangement 930 may be substantially coextensive with a viewing area of interactive display 902. Arrangement 930 may output one or more signals responsive to a user touch or gesture. Signals outputted by arrangement 930, via signal path 911, may be analyzed by processor 904 to recognize an instance of the user touch or gesture. For example, processor 904 may analyze the signals from arrangement 930 to determine a location of a touch on interactive display 902 and/or a location, direction, and/or velocity of a sensed gesture with respect to interactive display 902. Processor 904 may then control interactive display 902 responsive to the user gesture, by way of signals sent to interactive display 902 via signal path 913.

Figure 9B:
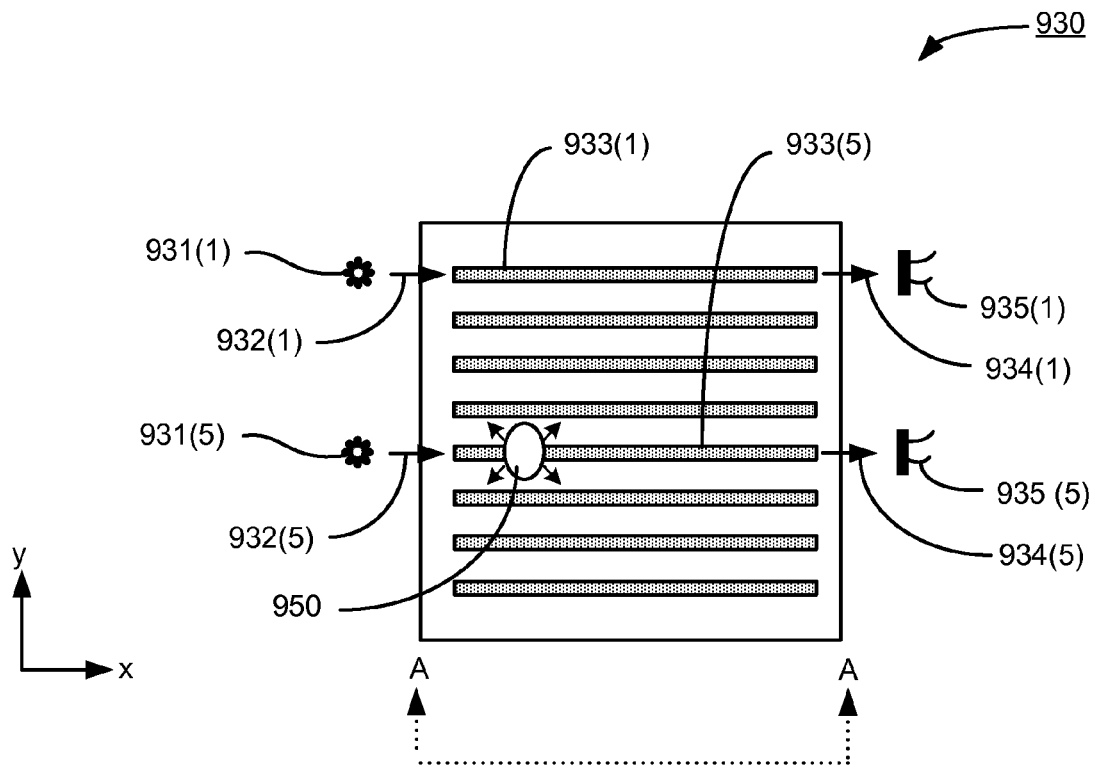
FIGS. 9B-9I show examples of an arrangement, including a channel waveguide, an input signal source, and a detector, configured to output a signal representative of a position of an object proximate to the waveguide.
Figure 9B:

FIGS. 9B-9I show examples of an arrangement, including a channel waveguide, an input signal source, and a detector, configured to output a signal representative of a position of an object proximate to the waveguide. Referring now to FIG. 9B, an example of arrangement 930 is illustrated that includes channel waveguides 933, and input signal sources 931, which generate first signals 932. The first signals 932 may include various types of signals, such as, for example, electromagnetic signals or acoustic signals.

It will be appreciated that, for clarity of illustration, FIGS. 9B-9I are not drawn to scale. For example, the characteristic cross sectional dimension of a channel waveguide 933 (in direction Y of FIG. 9B, for example) may be much smaller relative to the axial dimension (in direction X of FIG. 9B, for example) and the spacing between waveguides 933 (in direction Y of FIG. 9B) than suggested by the illustration. In an implementation, for example, the cross sectional diameter of a circular channel waveguide may generally be approximately equal to the wavelength of the light or other electromagnetic wave being propagated, that is, on the order of 1-10 microns. By way of comparison, the longitudinal dimension may be several centimeters and the spacing between channel waveguides 933 may be a few millimeters, for example.

Channel waveguide 933 may advantageously be configured to provide two dimensional guidance to the signals 932, such that the signals 932 are free to propagate only along a third dimension, that may be referred to as the axial, or longitudinal, axis of channel waveguide 933. As a result, within channel waveguide 933, electromagnetic radiation, for example, may normally be in an evanescent state, because the dimensions of channel waveguide 933 transverse to the longitudinal axis, are approximately equal to the wavelength of the light or other electromagnetic wave being propagated. Channel waveguide 933 may include an optical fiber, for example, or be fabricated on a substrate using lithographic methods in combination with, for example, epitaxy, ion exchange, or thermal diffusion.

In an implementation, input signal sources 931 may include a light-emitting diode (LED) configured to emit primarily infrared light. However, any type of source of electromagnetic or acoustic energy may be used. For example, input signal sources 931 may include one or more organic light emitting devices ("OLEDs"), lasers (for example, diode lasers or other laser sources), hot or cold cathode fluorescent lamps, incandescent or halogen light sources. In the illustrated implementation, each input signal source 931 is disposed at an end of channel waveguide 933. However, alternative configurations are within the contemplation of the present disclosure. For example, input signal source 931 may be remote from channel waveguide 933 and signals produced by input signal source 931 may be transmitted to channel waveguide 933 by additional optical elements such as, for example, one or more optical fibers, reflectors, etc. In some implementations, input signal source 931 may be configured to emit light over a solid angle. The solid angle may be selected to enhance gesture recognition reliability, for example.

First signals 932 may be inputs to channel waveguides 933. Detectors 935 may be configured to receive, from channel waveguides 933, second signals 934 corresponding to first signals 932. Detectors 935 may include photosensitive elements, such as photodiodes, phototransistors, charge coupled device (CCD) arrays, complementary metal oxide semiconductor (CMOS) arrays or other suitable devices operable to output a signal representative of a characteristic of detected visible, infrared (IR) and/or ultraviolet (UV) light. Detectors 935 may output third signals via signal path 911 (FIG. 9A), which is representative of one or more characteristics of detected second signals 934. For example, the characteristics may include intensity, directionality, frequency, amplitude, amplitude modulation, and/or other properties.

The third signals may be analyzed to determine a position of an object proximate to the waveguide. The analysis may consider that each channel waveguide 933, in the absence of an object proximate to it, provides relatively low loss propagation of a first signal 932 to detector 935. For example, because an optical channel waveguide may propagate light in an evanescent state, a negligible amount of signal strength is lost, and noise from an ambient or display light is substantially prevented from propagating into the waveguide, notwithstanding that the waveguide wall may be made of a transparent material, such as glass. When, however, an object is in contact with or closely proximate to an exterior wall of a channel waveguide, propagation of first signal 932 may be affected. More particularly, in the case of an optical channel waveguide, such contact can scatter light and introduce transmission loss to the waveguide. Thus, referring still to FIG. 9B, a characteristic of second signal 934(5) received via waveguide 933(5) from input signal source 931(5) may be affected by the contact or close proximity of object 950. For example, a strength of second signal 934(5) may be reduced relative to, for example, second signal 934(1), which is not influenced by proximity of an object.

Object 950 may be, for example, a user's appendage, such as a hand or a finger, or it may be any physical object (e.g., a stylus), hand-held or otherwise under control of the user, but is herein referred to, for simplicity, as the "object."

Figure 9C:
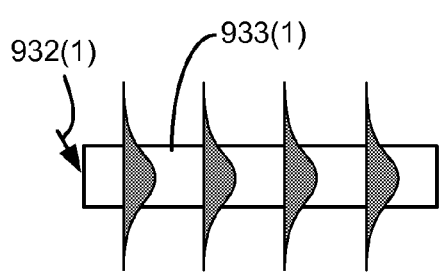
Figure 9D:
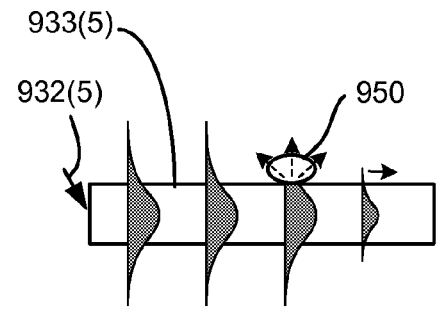

FIGS. 9C and 9D illustrate, respectively, a schematic of signal propagation within channel waveguide 933(1) and within channel waveguide 933(5). As shown in FIG. 9C, acoustic or electromagnetic energy introduced by signal 932(1) propagates along waveguide 933(1) and undergoes repeated TIR. As a result, the energy propagates as evanescent waves, with negligible loss of signal strength. Referring to FIG. 9D, it may be observed that presence of object 950 proximate to channel waveguide 933(5) results in scattering of, for example, light outside channel waveguide 933(5). As a result, strength of second signal 934(5) eventually received by detector 935(5) may be measurably reduced relative to strength of second signal 934(1) received by detector 935(1).

It will be appreciated that processor 904 may be configured to analyze signals output by a plurality of detectors 935 so as to recognize the presence and determine the position, at least along one axis (such as axis 'y' in FIG. 9B), of object 950. As a result, a position of a user's touch, for example, may be located, at least along a first axis.

In the illustrated implementation, each of the channel waveguides 933 is substantially straight, parallel to each other, and uniformly distributed along the 'y' axis. In some implementations, each channel waveguide 933 is part of a substantially rectilinear, uniform grid. It will be appreciated, however, that many other configurations are possible. The waveguides may be curved in some implementations, rather than straight, for example. Moreover, the waveguides 933 need not be uniformly spaced. For example, in some implementations the waveguides may be more closely spaced in regions of the viewing area where a higher resolution of position determination is desired, and more widely spaced elsewhere.

Figure 9E:
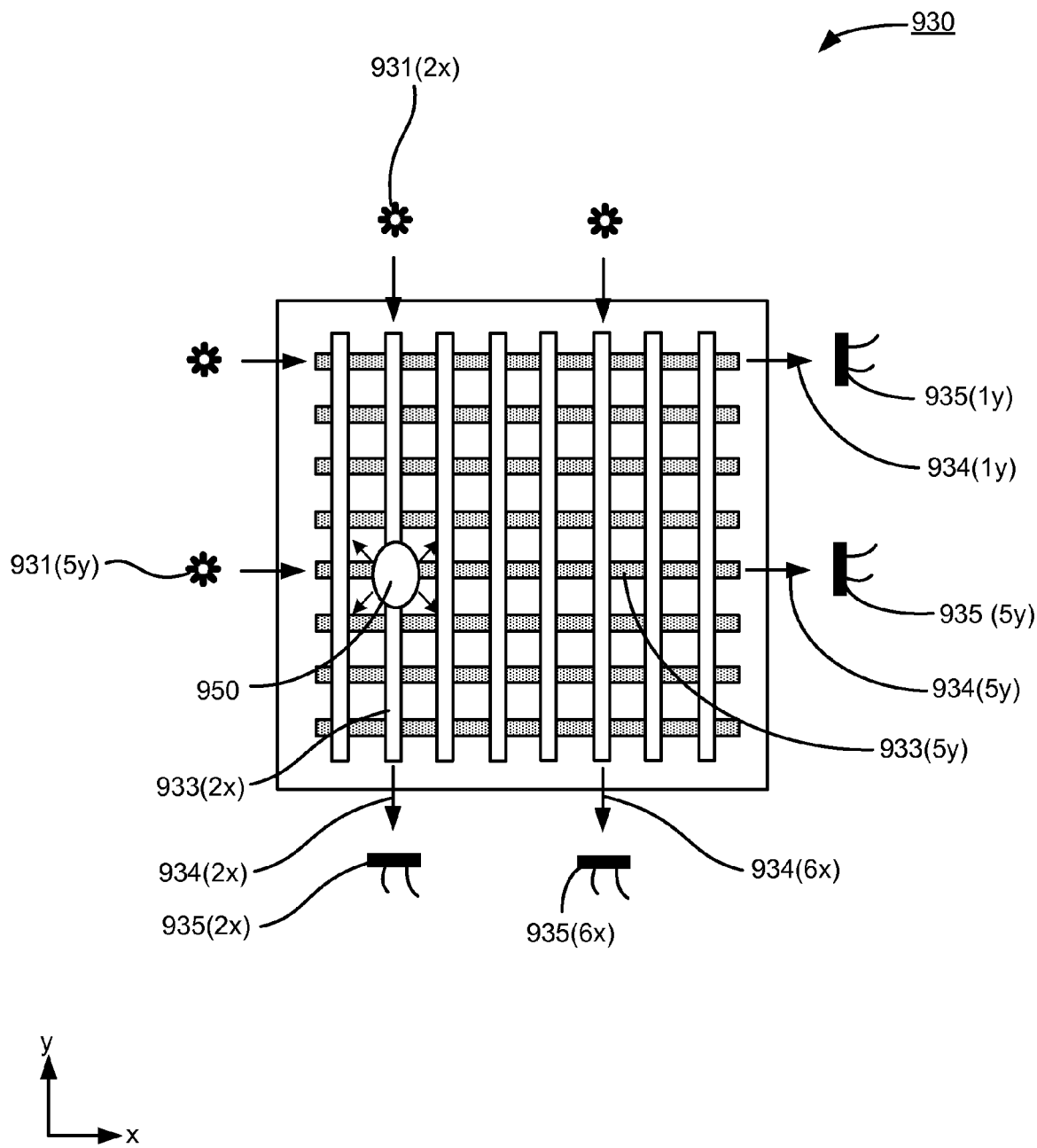

Referring now to FIG. 9E, an implementation is illustrated in which arrangement 930 is configured as a two dimensional (2D) grid of channel waveguides 933. As described above in connection with FIG. 9B, first signals 932 may be inputs to channel waveguides 933. Detectors 935 may be configured to receive, from channel waveguides 933, second signals 934 corresponding to first signals 932.

Each channel waveguide 933, in the absence of an object proximate to it, may provide low loss propagation of a first signal 932 to detector 935. For example, for an optical channel waveguide, because light is propagated in an evanescent state within the channel waveguide, a negligible amount of signal strength is lost, and noise from an ambient or display light is substantially prevented from propagating into the waveguide 933, notwithstanding that the waveguide wall may be made of a transparent material, such as glass.

When, however, an object is in contact with or closely proximate to an exterior wall of a channel waveguide 933, propagation of first signal 932 may be affected. More particularly, such contact can scatter light and introduce transmission loss to the waveguide 933. Thus, referring still to FIG. 9E, a characteristic of second signal 934(5y) received by detector 935(5y) via waveguide 933(5y) from input signal source 931(5y) may be affected by the contact or close proximity of object 950. For example, a strength of second signal 934(5y) may be reduced relative to, for example, second signal 934(1y), which is not influenced by proximity of an object. Similarly, a characteristic of second signal 934(2x) received by detector 935(2x) via waveguide 933(2x) from input signal source 931(2x) may be affected by the contact or close proximity of object 950. For example, a strength of second signal 934(2x) may be reduced relative to, for example, second signal 934(6x), which is not influenced by proximity of the object 950.

As a result, strength of second signals 934(5y) and 934(2x) received by detectors 935(5y) and 935(2x) may be measurably reduced relative to strength of, for example, second signals 934(1y) received by detector 935(1y) or second signals 934(6x) received by detector 935(6x).

It will be appreciated that processor 904 may be configured to analyze third signals output by a plurality of detectors 935 so as to recognize the presence and determine the 2D (x,y) position of object 950. As a result, a position of a user's touch, for example, may be located, with respect to both axes.

In some implementations, the grid may include a set of channel waveguides disposed in two or more stacked planes. For example, channel waveguides aligned along axis X, may be disposed in a first plane, and channel waveguides aligned along axis Y may be disposed in a second, substantially parallel plane. In other implementations, all channel waveguides may be substantially coplanar and configured in a waffle-like grid of signal channels.

Figure 9F:
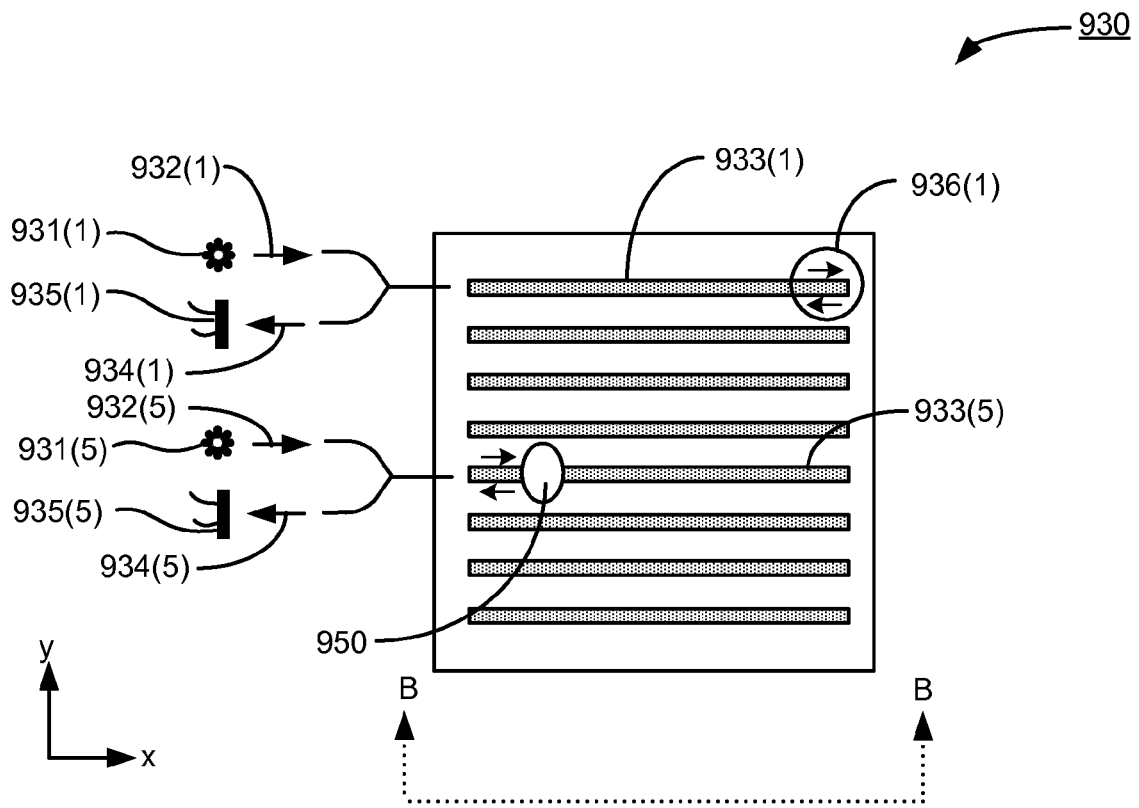
Figure 9F:

Referring now to FIG. 9F, an implementation is illustrated in which arrangement 930 is configured to provide a 2D position determination capability, using channel waveguides 933 substantially parallel to a single axis.

First signals 932 may be inputs to each channel waveguides 933 from a respective input signal source 931. Detectors 935 may be configured to receive, from channel waveguides 933, second signals 934 corresponding to first signals 932. Second signals 934 may result from reflection of first signals 932. For example, in the illustrated implementation, second signals 934(1) may result from reflection of first signals 932(1) at a terminus 936(1) of channel waveguide 933(1). As a result, detectors 935 may be located proximate to input signal source 931 and be coupled to a single end of channel waveguide 933. Detectors 935 may output third signals via signal path 911 (FIG. 9A) representative of one or more characteristics of detected second signals 934.

The third signals may be analyzed to determine a position of an object proximate to the waveguide. The analysis may consider that each channel waveguide 933, in the absence of an object proximate to it, provides low loss propagation of a first signal 932 to detector 935. When, however, an object is in contact with or closely proximate to an exterior wall of a channel waveguide 933, propagation of first signal 932 may be affected. Thus, referring still to FIG. 9F, a characteristic of second signal 934(5) received via channel waveguide 933(5) from input signal source 931(5) may be affected by the contact or close proximity of object 950.

Figure 9G:
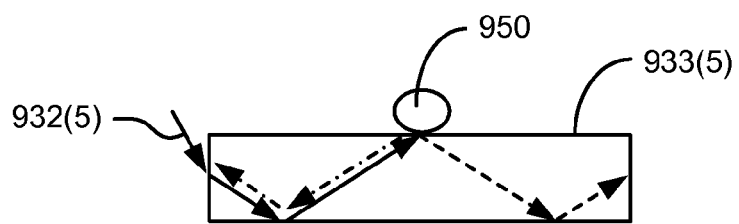

For example, referring now to FIG. 9G, which illustrates a schematic of signal propagation within channel waveguide 933(5), an effect of object 950 is illustrated. More particularly, it may be observed that presence of object 950 proximate to channel waveguide 933(5) results in reflecting light into channel waveguide 933(5) that is back-propagated (dashed lines) toward and away from input signal source 931(5).

Thus, second signal 934(5) may include back-propagated light reflected from object 950. Such back-propagated light may be received within a time interval ("fly time") that is measurably shorter than the interval of time required for second signal 934(1) to be received after reflection from terminus 936(1). The difference in fly time between signals, for example, between second signal 934(1) and second signal 934(5) may be determined by interferometric techniques using, for example a Michelson interferometer, a common path interferometer, or other such techniques.

It will be appreciated that processor 904 may be configured to analyze third signals output by a plurality of detectors 935 so as to recognize the presence and determine the 2D (x,y) position of object 950. More particularly, in the implementation illustrated in FIG. 9F, identification of the channel waveguide(s) 933(i) affected by object 950 may provide 'Y' axis position location information, whereas analysis of fly time may provide 'X' axis position location information. As a result, a position of a user's touch, for example, may be located, with respect to both axes.

In the illustrated embodiment, each channel waveguide 933 is substantially straight, parallel to the other waveguides, and uniformly distributed along the 'y' axis. It will be appreciated, however, that many other configurations are possible. The waveguides may be curved in some implementations, rather than straight, for example. Moreover, the waveguides need not be uniformly spaced. For example, in some implementations the waveguides may be more closely spaced in regions of the viewing area where a higher resolution of position determination is desired, and more widely spaced elsewhere.

The present inventors have appreciated that the techniques described hereinabove may be extended so as to provide 2D position location capability with a relatively few number of channel waveguides. Indeed, 2D position location capability may be provided using as few as one waveguide, disposed in a square or circular spiral arrangement, for example, or in a serpentine, configuration. The serpentine configuration may be 'S' shaped, for example, or any other winding or sinuous pattern.

Figure 9H:
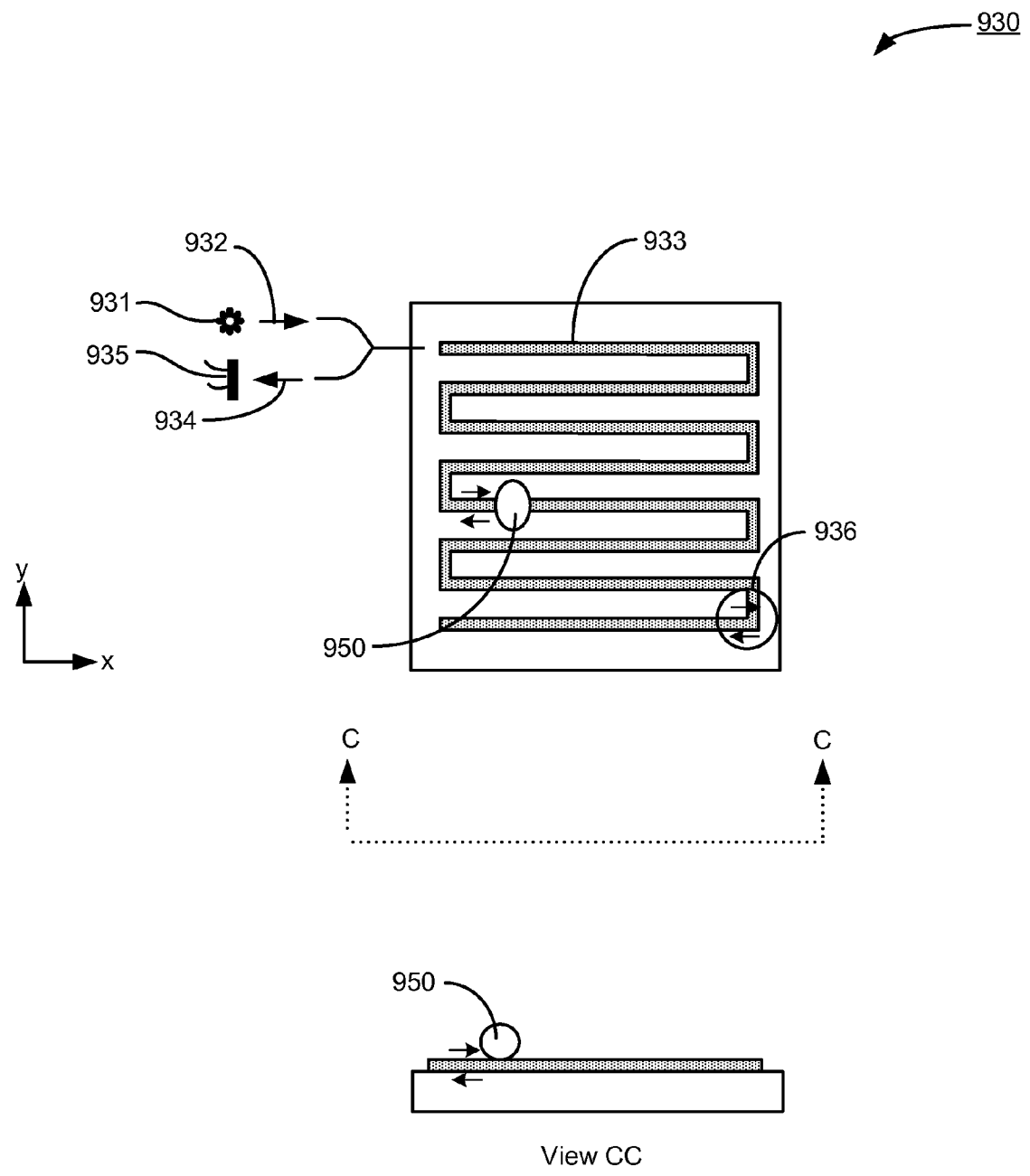

For example, referring now to FIG. 9H, channel waveguide 933 is illustrated as being disposed in a serpentine configuration. First signals 932 may be inputs to channel waveguide 933 from input signal source 931. Detectors 935 may be configured to receive, from channel waveguide 933, second signal 934. Second signal 934 may result from reflection of first signal 932. For example, in the illustrated implementation, second signal 934 may result at least in part from back propagation of light reflected from object 950. Detectors 935 may output third signals via signal path 911 (FIG. 9A) representative of one or more characteristics of detected second signal 934.

The third signals may be analyzed to determine a position of an object proximate to the waveguide. The analysis may consider that channel waveguide 933, in the absence of an object proximate to it, provides low loss propagation of a first signal 932 to detector 935. When, however, an object is in contact with or closely proximate to an exterior wall of a channel waveguide 933, propagation of first signal 932 may be affected.

Thus, referring still to FIG. 9H, a characteristic of second signal 934 received via channel waveguide 933 from input signal source 931 may be affected by the contact or close proximity of object 950. More particularly, second signal 934 may include back-propagated light reflected from object 950. Such back-propagated light may be received within a time interval ("fly time") that is measurably shorter than the interval of time required for second signal 934 to be received after reflection from terminus 936. The difference in fly time between a signal reflected from terminus 936 and a signal representative of back-propagated light reflected from object 950 may be determined using optical interferometric techniques, for example.

It will be appreciated that processor 904 may be configured to analyze third signals output by detector 935 so as to recognize the presence and determine the 2D (x,y) position of object 950. More particularly, in the implementation illustrated in FIG. 9H, where channel waveguide 933 is in a serpentine configuration, analysis of the fly time of back-propagated light reflected from object 950 may identify where along the length of the serpentine object 950 is located. This information, together with knowledge of the serpentine geometry, yields a 2D position determination of object 950.

In the illustrated implementation, a particular example of a serpentine configuration is illustrated. It will be appreciated, however, that many other configurations are possible. The waveguides may be curved in some implementations, rather than straight, for example and bends may have substantial radius of curvature rather than being square, as illustrated. Moreover, respective segments of the serpentine need not be uniformly spaced. For example, in some implementations the segments may be more closely spaced in regions of the viewing area where a higher resolution of position determination is desired, and more widely spaced elsewhere. Finally, spiral configurations, either rectangular, circular or ovoid, are also within the contemplation of the present disclosure.

In the above described implementations, input signal source 931 has been illustrated as an active signal source that is independent of, for example, ambient or display light. In other implementations, a passive input signal source may be advantageous. By "passive" input signal source, it is meant ambient and/or display light reflected or scattered from object 950.

Figure 9I:
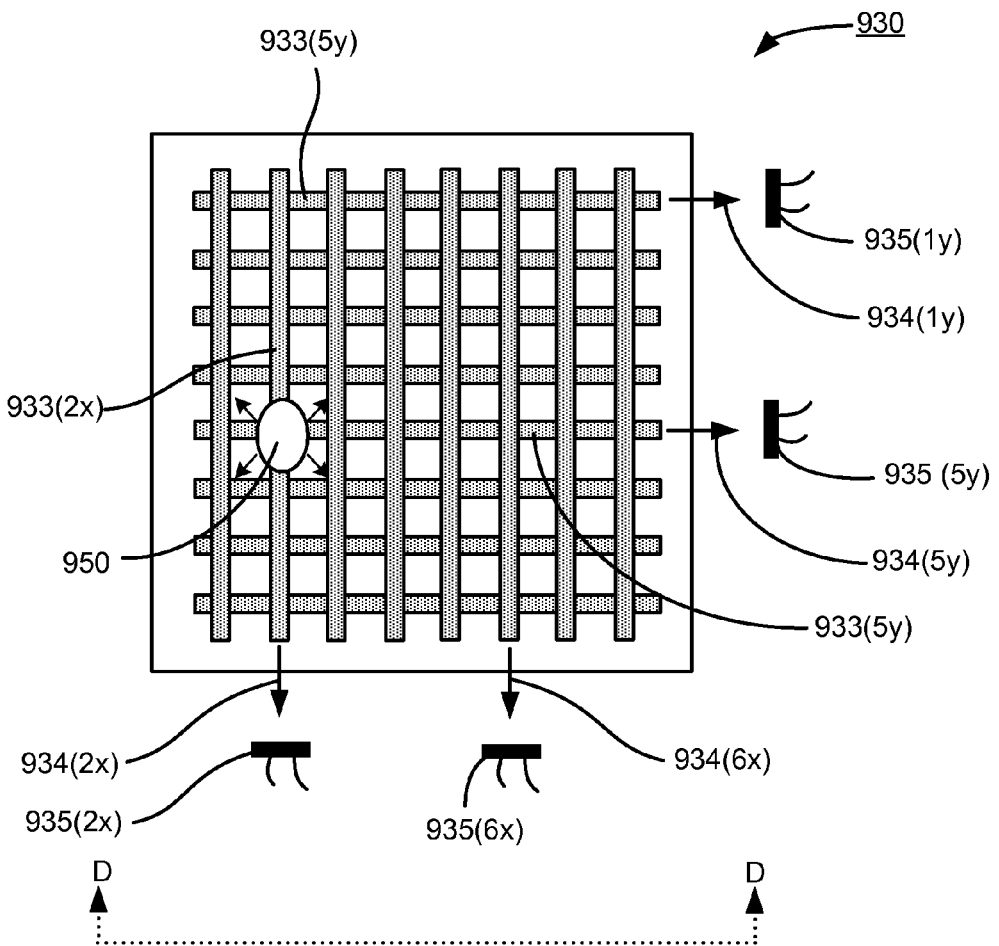
Figure 9I:
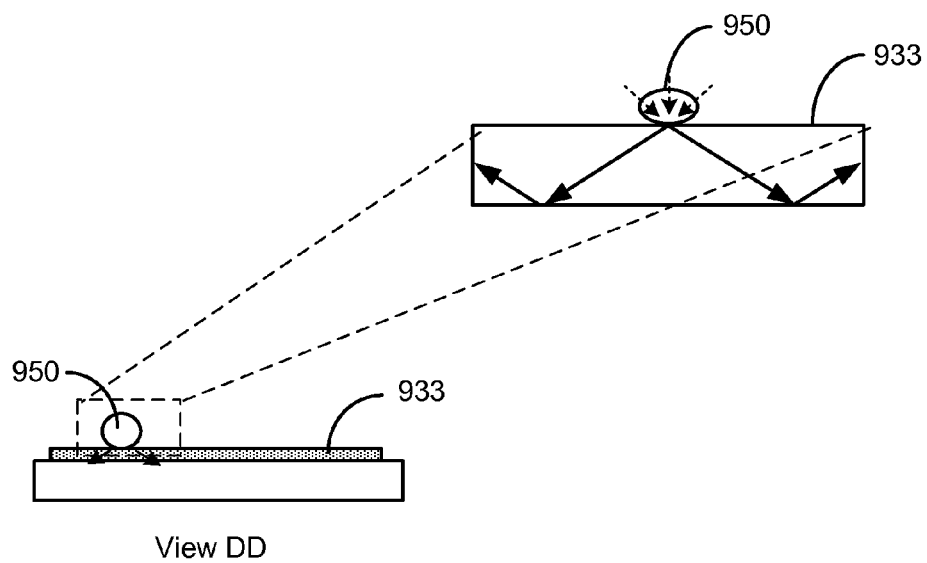

For example, referring now to FIG. 9I, some of light scattered from object 950 may enter channel waveguide 933 where it may be propagated toward one or more detectors For example, a characteristic of second signal 934(5y) received by detector 935(5y) via channel waveguide 933(5y) may be affected by light scattered or reflected from object 950. Similarly, a characteristic of second signal 934(2x) received by detector 935(2x) via channel waveguide 933(2x) may be affected by the contact or close proximity of object 950.

As a result, characteristics of second signals 934(5y) and 934(2x) received by detectors 935(5y) and 935(2x) may be measurably different from characteristics of second signals 934(1y) received by detector 935(1y) or second signals 934 (6x) received by detector 935(6x).

It will be appreciated that processor 904 may be configured to analyze third signals output by a plurality of detectors 935 so as to recognize the presence and determine the 2D (x,y) position of object 950. As a result, a position of a user's touch, for example, may be located, with respect to both axes.

In the above described implementations, 2D position location techniques relied on physical contact or at least close physical proximity of object 950 to a channel waveguide 933. The presently disclosed techniques, however, may also be applied to provide a user interface that is responsive, at least in part, to "gestures" by which is meant, the electronic device senses and reacts in a deterministic way to gross motions of a user's hand, digit, or hand-held object. The gestures may be made proximate to, but, advantageously, not in direct physical contact with the electronic device.

Figure 10A:
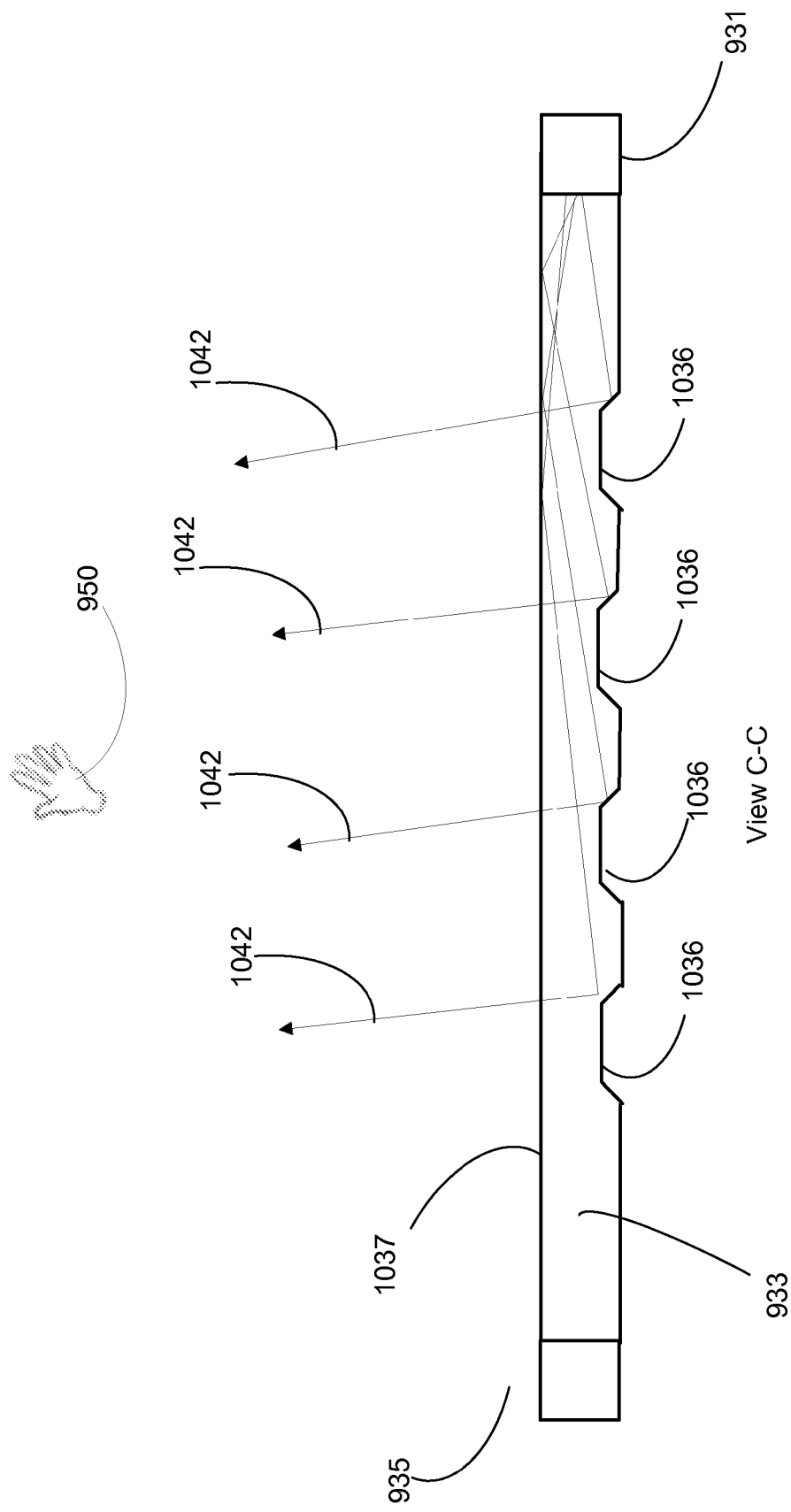
FIGS. 10A-10B show an example of a channel waveguide configured for gesture recognition.
Figure 10B:
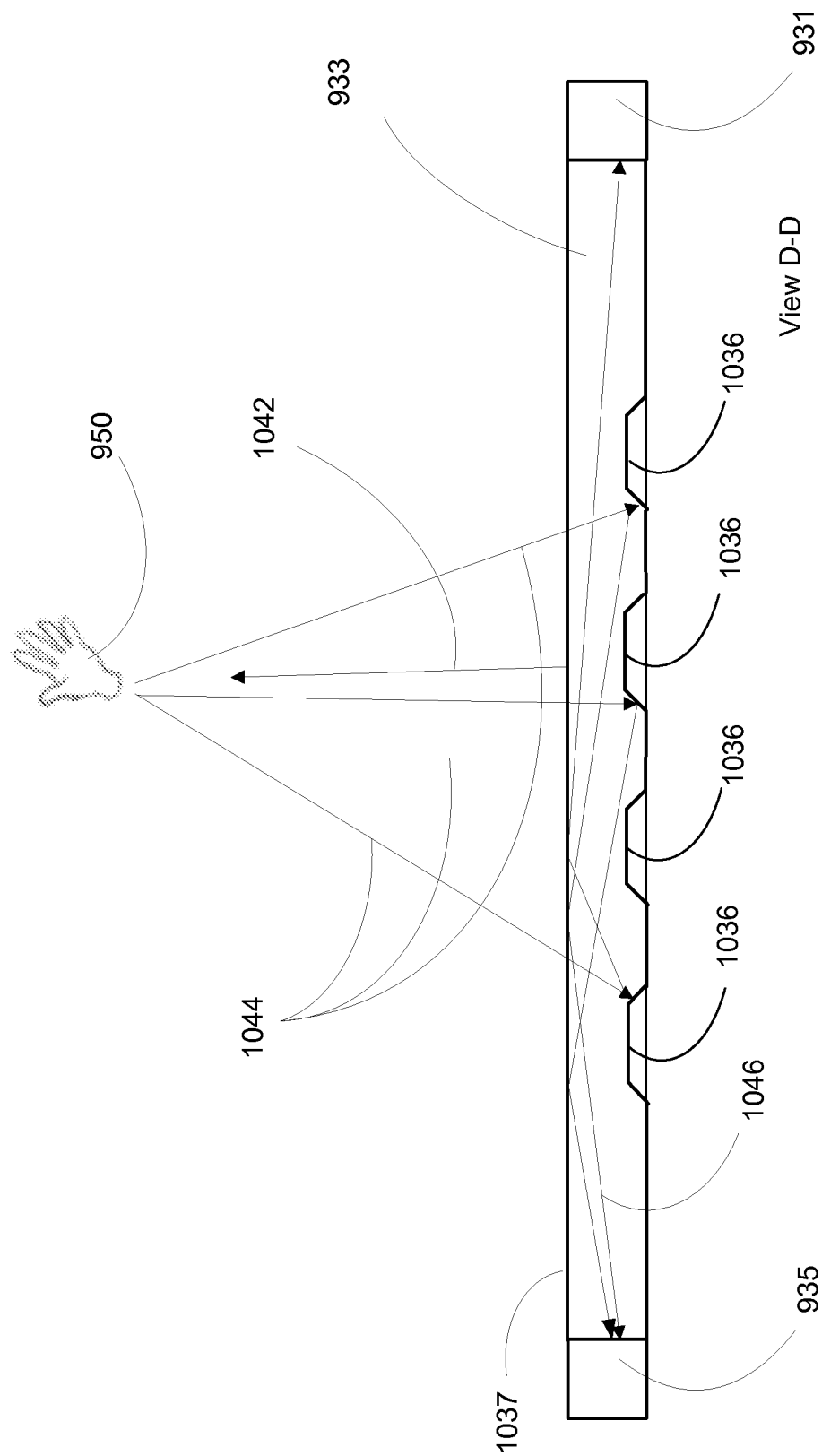

FIGS. 10A-10B show an example of a channel waveguide configured for gesture recognition. Channel waveguide 933 may include light turning devices that reflect emitted light received from input signal source 931 in a direction having a substantial component orthogonal to front surface 1037 of channel waveguide 933. As a result, at least a fraction of the emitted light may escape channel waveguide 933, as reflected light 1042, into a region where a gesture is to be detected.

In an implementation, the light-turning devices may include a number of reflective microstructures 1036 that redirect light emitted by input signal source 931 in a direction having a substantial component orthogonal to front surface 1037 of channel waveguide 933. As described in more detail herein below, microstructures 1036 can all be identical, or have different shapes, sizes, structures, etc., in various implementations. Microstructures 1036 may redirect light emitted by input signal source 931 such that at least a substantial fraction of reflected light 1042 intersects front surface 1037 at an angle to normal such that the light escapes channel waveguide 933.

Instead of, or in addition to, microstructures, other light turning devices are within the contemplation of the present disclosure, including, for example, holographic film and surface relief grating that turn light by diffraction or surface roughness that turns light by scattering.

It will be appreciated that reflected light 1042 may be dispersed at a wide variety of angles. As a result, some of reflected light 1042 may be directed away from object 950, toward, or away from, a user's field of vision, for example.

As illustrated in FIG. 10B, when object 950 interacts with reflected light 1042, scattered light 1044, resulting from the interaction, may be directed back toward channel waveguide 933. Microstructures 1036 may redirect such light toward one or more of detectors 935. For example, redirected scattered light 1046 may be turned in a direction having a substantial component parallel to front surface 1037 of channel waveguide 933. More particularly, at least a substantial fraction of redirected scattered light undergoes propagates within channel waveguide 933. As a result, such redirected collected scattered light 1046 does not exit channel waveguide 933, but instead reaches one or more of detectors 935. Each detector 935 may be configured to detect one or more characteristics of the redirected collected scattered light 1046, and output a signal representative of the detected characteristics. For example, the characteristics may include intensity, directionality, frequency, amplitude, amplitude modulation, and/or other properties.

Figure 11C:
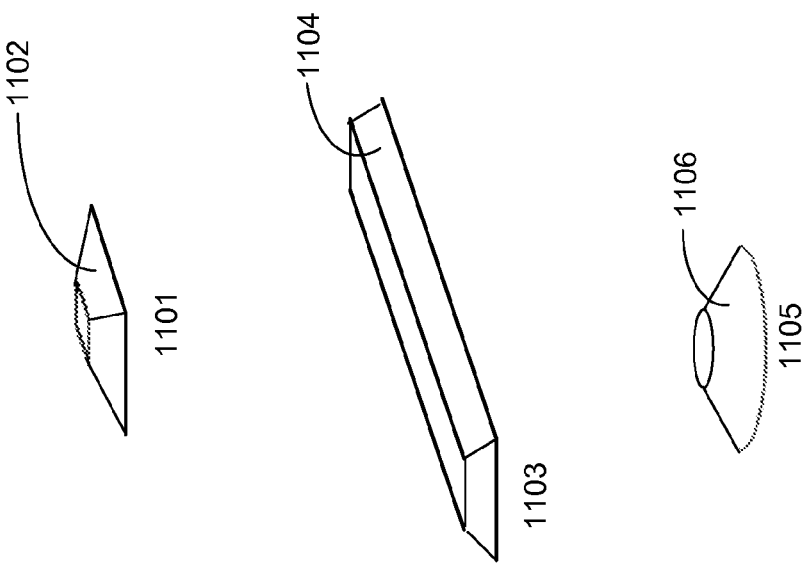
FIGS. 11A-C show examples of light-turning microstructures according to some implementations.
Figure 11B:
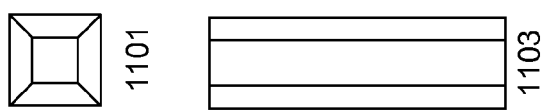
Figure 11A:
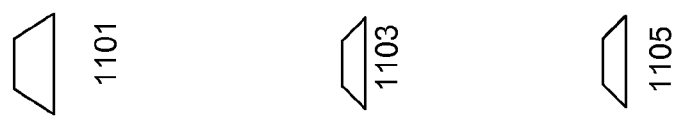

FIGS. 11A-C show examples of light-turning microstructures according to some implementations. FIGS. 11A, 11B, and 11C show, respectively, an elevation view, a plan view, and a perspective view of microstructures 1101, 1103 and 1105. It will be appreciated that the illustration shows a highly magnified view of the microstructures, which will ordinarily be small, for example, in some implementations having a height of approximately 1 to 10 μm and a width 3 to 50 μm. Each microstructure, advantageously, will have one or more reflective surfaces, for example reflective surfaces 1102, 1104, and 1106 that are configured to redirect light. More particularly, incident light directed in a direction having a substantial component parallel to the front surface of interactive display 902 may be reflected in a direction having a substantial component orthogonal to the front surface of interactive display 902. Similarly, incident light directed in a direction having a substantial component orthogonal to the front surface of interactive display 902 may be reflected in a direction having a substantial component parallel to the front surface of interactive display 902. It will be appreciated that many geometries of such microstructures are possible, and the examples provided in FIGS. 11A-11C are merely illustrative of a few possible implementations.

In some implementations microstructures such as those illustrated in FIGS. 11A-11C may be formed by printing successive layers and structures on top of each other in sheets. In other implementations, embossing and/or molding techniques may be used to create the microstructures. In some implementations, a reflective surface may be selectively provided by metallizing a glass substrate, for example. Reflective surfaces 1102, 1104, and 1106 may be prepared using photolithography and wet chemical etching techniques, for example. In some implementations, reflective surfaces 1102, 1104, and 1106 may be fabricated into a SiON layer deposited on a glass substrate. In such implementations, masks may be used, and a thin metal layer (about 500-1000 Angstroms thick, for example) may be deposited only on the reflective surfaces.

Referring again to FIG. 9A, processor 904 may be configured to receive, from detector 935, signals representative of the detected characteristics, via signal path 911. Processor 904 may analyze signals received from one or more detectors 935 to calculate a position of object 950, in, at least, a two dimensional plane parallel to the front surface of interactive display 902. For example, by comparing the output signal of each detector 935, processor 904 may determine the position of object 950, in a plane generally parallel with the front surface of interactive display 902. As a further example, a motion of object 950 may cause light received by detectors 935 to produce a signal pattern. Processor 904 may be configured to analyze the signal pattern and determine when the signal pattern is indicative of a characteristic of a particular user gesture. The signal pattern may include characteristics such as signal intensity and/or waveform. For example, the intensity of a signal generated at all detectors may change as object 950 comes closer to the screen. As a further example, a pulse-like waveform may be detected by one or more detectors 935 when, for example, a hand with fingers spaced apart moves across a plane generally parallel with the front surface of interactive display 902.

Processor 904 may be configured to recognize, from the output signals of detectors 935, an instance of a user gesture. Moreover, processor 904 may control one or both of interactive display 902 and/or other elements of the electronic device 900, responsive to the user gesture. For example, an image displayed on interactive display 902 may be caused to be scrolled up or down, rotated, enlarged, or otherwise modified. In addition, the processor 904 may be configured to control other aspects of electronic device 900, responsive to the user gesture, such as, for example, changing a volume setting, turning power off, placing or terminating a call, launching or terminating a software application, etc.

Figure 12A:
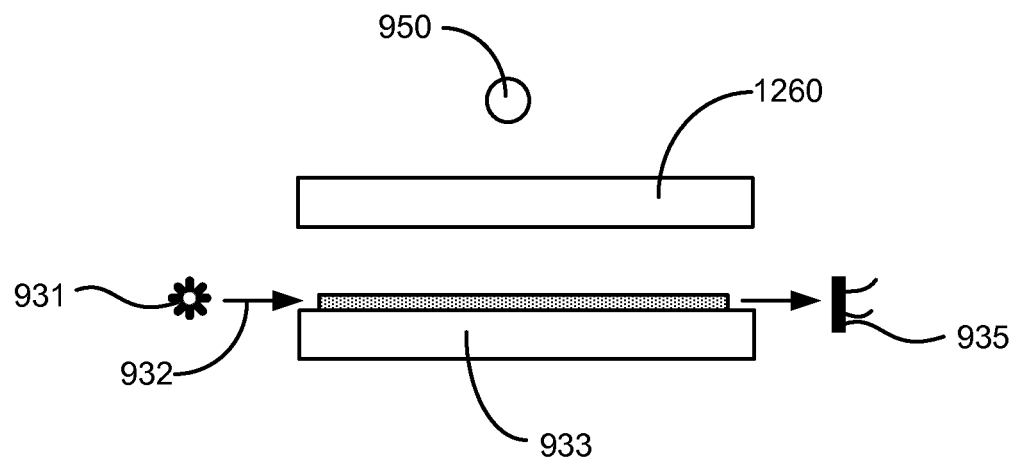
FIGS. 12A-B show an example of an implementation having at least one intervening layer between the channel waveguide and a user.
Figure 12B:
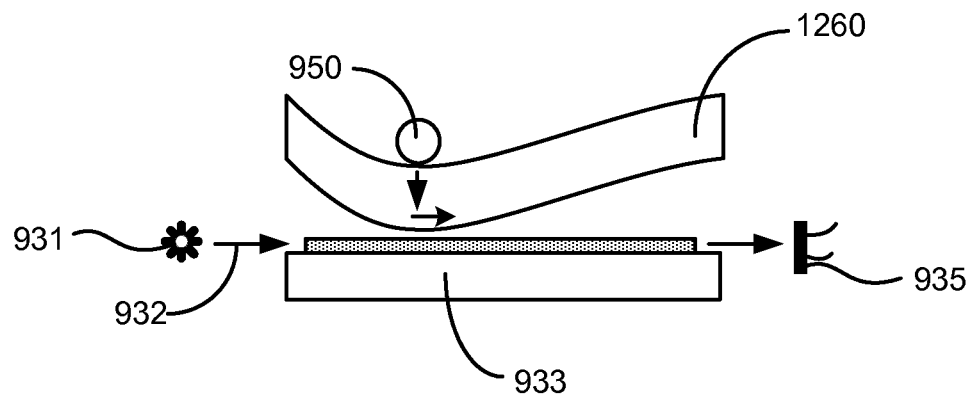

In some implementations, at least one intervening layer is disposed between channel waveguide 933 and a surface on which a touch (or above which a gesture) is to be recognized. FIGS. 12A-B show an example of an implementation having at least one intervening layer between the channel waveguide and a user. Referring to FIG. 12A, it may be observed that, in the absence of contact by object 950, layer 1260 may be disposed such that layer 1260 is relatively far apart from channel waveguide 933. For example, in the absence of contact by object 950, layer 1260 may be separated by a distance greater than the wavelength of the light or other electromagnetic wave being propagated by channel waveguide 933. As a result, signals may propagate with low loss in channel waveguide 933. When touched by object 950, however, referring now to FIG. 12B, layer 1260 may come into contact with channel waveguide 933. As a result, strength of second signal 934 may be measurably reduced, as energy is leaked from channel waveguide 933 into layer 1260. This diminution in signal strength may be used to determine a position of object 950 using the techniques disclosed herein.

Figure 13A:
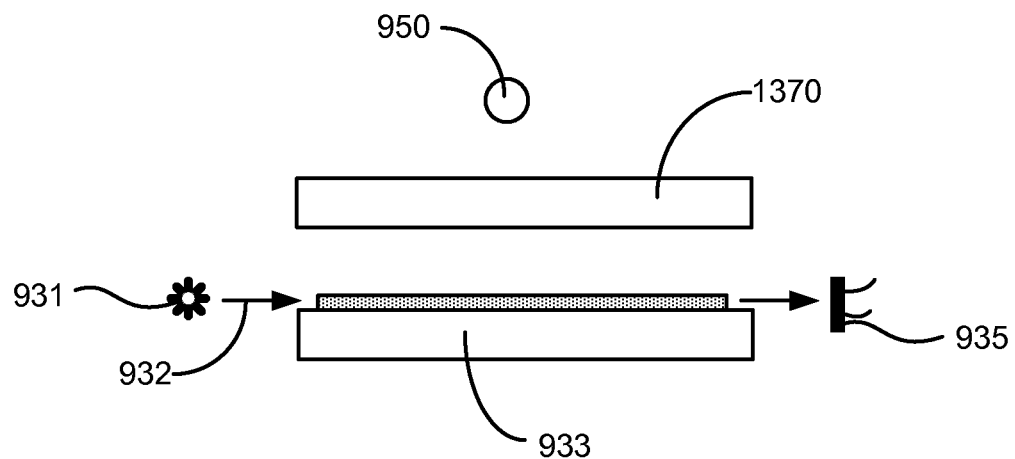
FIGS. 13A and 13B show an example of an implementation having a planar light guide disposed between the channel waveguide and a user.
Figure 13B:
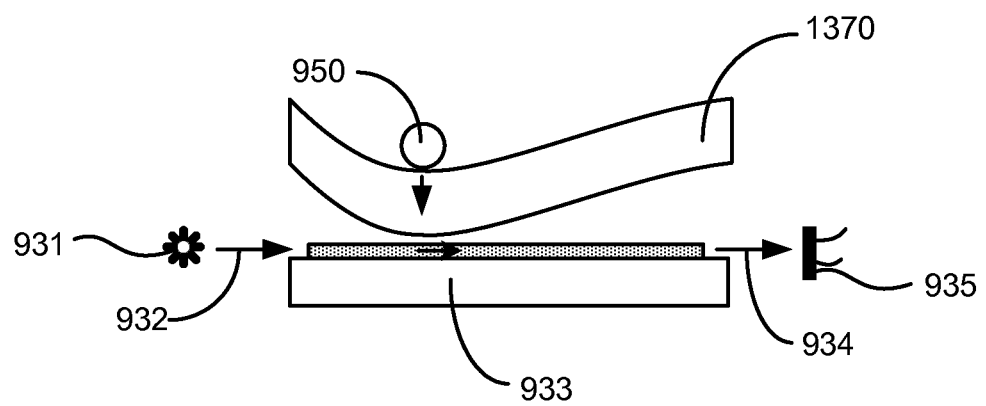

In some implementations, at least one intervening planar light guide is disposed between channel waveguide 933 and a surface on which a touch (or above which a gesture) is to be recognized. FIGS. 13A and 13B show an example of an implementation having a planar light guide disposed between the channel waveguide and a user. In the illustrated implementation, input signal source 931, which may be a light emitting source, emits first signals 932 into planar light guide 1370. Referring to FIG. 13A, it may be observed that, in the absence of contact by object 950, light guide 1370 may be disposed such that it is relatively far apart from channel waveguide 933 and signals may propagate with low loss in light guide 1370. When touched by object 950, however, referring now to FIG. 12B, light guide 1370 may come into contact with channel waveguide 933. As a result, some light may be leaked from light guide 1370 into channel waveguide 933, and be detected by detector 935. Signals output by detector 935, responsive to the detected light, may be used to determine a position of object 950 using the techniques disclosed herein.

Figure 14A:
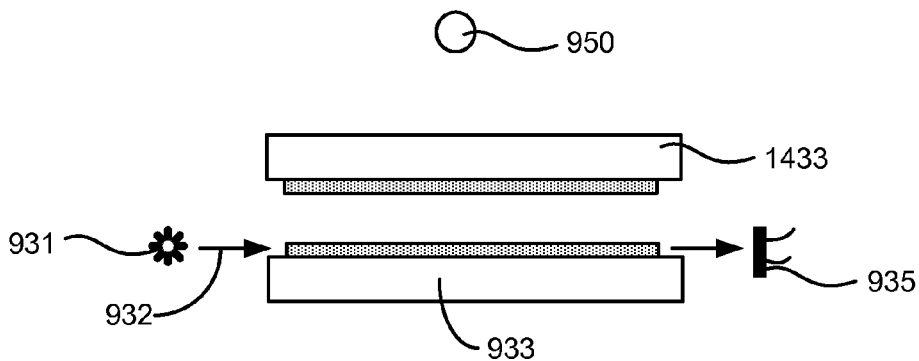
FIGS. 14A through 14D show examples of implementations having a second channel waveguide disposed between a first channel waveguide and a user.

In some implementations, at least a second intervening channel waveguide is disposed between channel waveguide 933 and a surface on which a touch (or above which a gesture) is to be recognized. FIGS. 14A through 14D show examples of implementations having a second channel waveguide disposed between a first channel waveguide and a user. In the implementation illustrated in FIGS. 14A and 14B, input signal source 931 emits first signals 932 into channel waveguide 933. Referring to FIG. 14A, it may be observed that, in the absence of contact by object 950, second channel waveguide 1433 may be disposed such that it is relatively far apart from channel waveguide 933 and signals may propagate with low loss in channel waveguide 933. When touched by object 950, however, referring now to FIG. 14B, channel waveguide 1433 may come into contact with channel waveguide 933. As a result, strength of second signal 934 may be measurably reduced, as energy is leaked from channel waveguide 933 into second channel waveguide 1433. This diminution in signal strength may be used to determine a position of object 950 using the techniques disclosed herein.

Figure 14B:
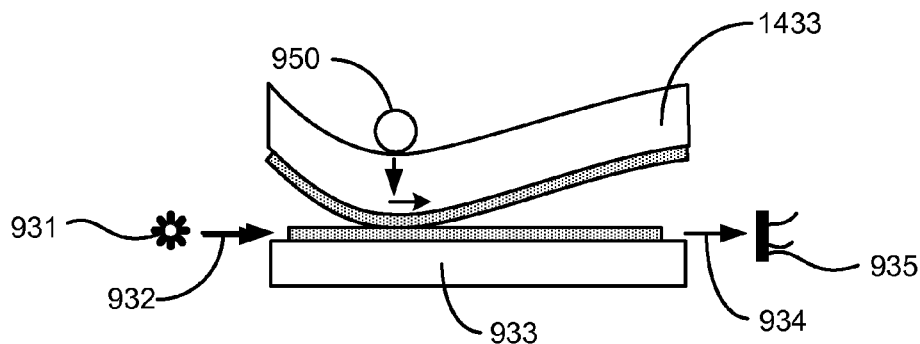
Figure 14C:
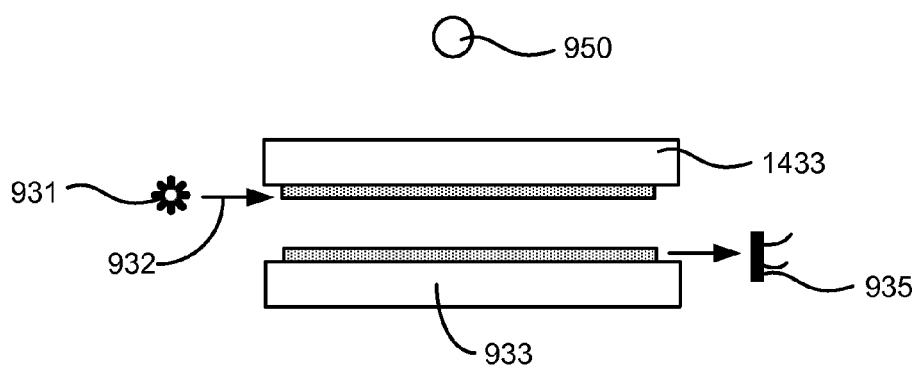
Figure 14D:
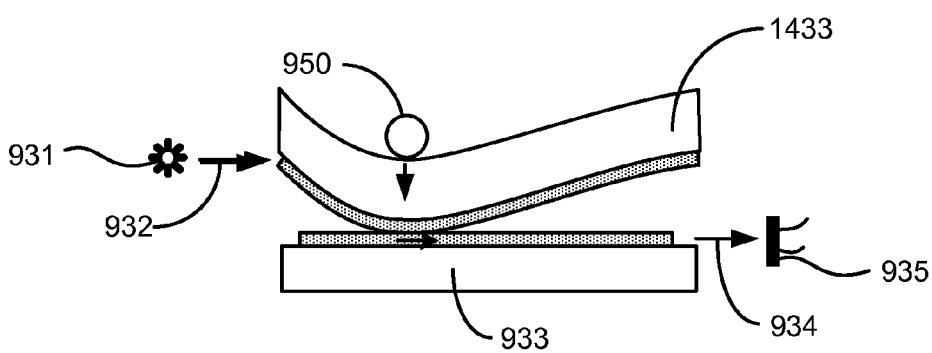

In the implementation illustrated in FIGS. 14A and 14B, input signal source 931 and detector 935 are directly coupled by channel waveguide 933. This is not necessarily the case, as illustrated in FIGS. 14C and 14D. In the illustrated implementation, input signal source 931, emits first signals 932 into second channel waveguide 1433. Referring to FIG. 14C, it may be observed that, in the absence of contact by object 950, second channel waveguide 1433 may be disposed such that it is relatively far apart from channel waveguide 933 and signals may propagate with low loss in second channel waveguide 1433. When touched by object 950, however, referring now to FIG. 14D, second channel waveguide 1433 may come into contact with channel waveguide 933. As a result, signals leaked from second channel waveguide 1433 into channel waveguide 933 may be detected by detector 935. Signals output by detector 935, responsive to the detected light, may be used to determine a position of object 950 using the techniques disclosed herein.

It will be appreciated that the implementations described above are provided as examples only, and that many variations are possible. For example, although intervening layers have been illustrated that separate object 950 from channel waveguide 933, it is within the contemplation of the present inventors, that channel waveguide 933 may separate object 950 from layer 1260, planar light guide 1370 or channel light guide 1433.

Figure 15:
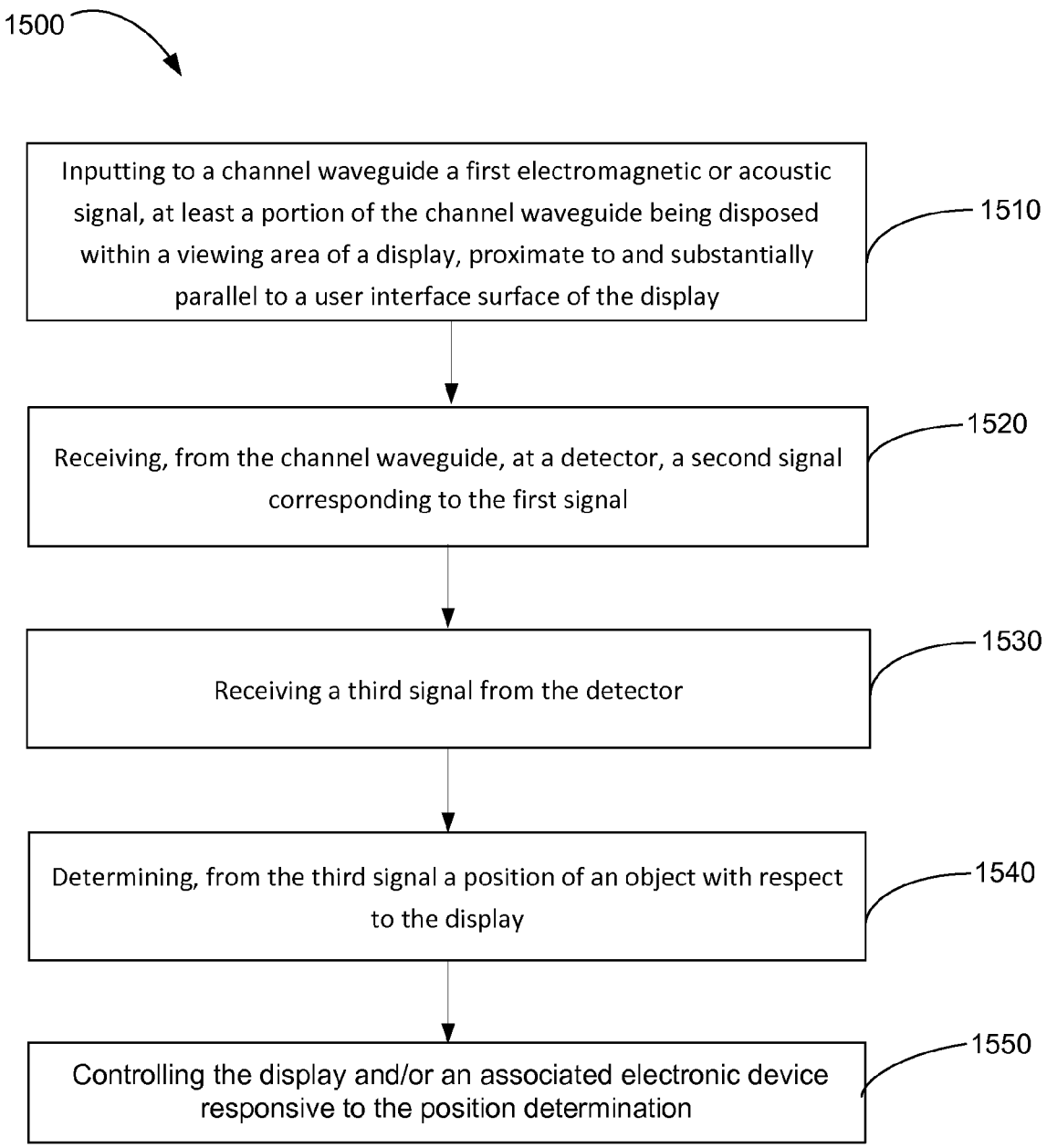
FIG. 15 shows an example of a flow diagram illustrating a method for controlling an interactive display and/or an associated electronic device.

FIG. 15 shows an example of a flow diagram illustrating a method for controlling an interactive display and/or an associated electronic device. At block 1510, a first electromagnetic or acoustic signal may be input to a channel waveguide. At least a portion of the channel waveguide may be disposed within a viewing area of a display, proximate to and substantially parallel to a user interface surface of the display. Advantageously, the channel waveguide may be configured to provide two dimensional guidance to an electromagnetic or acoustic signal, such that the signal is free to propagate only along the longitudinal axis of the channel waveguide.

At block 1520, a second signal may be received from the channel waveguide by a detector, the second signal corresponding to the first signal. The detector may include photosensitive elements, such as photodiodes, phototransistors, CCD arrays, CMOS arrays or other suitable devices operable to output a signal representative of a characteristic of detected visible, IR and/or UV light. The detector may output a third signal representative of one or more characteristics of the detected second signal.

At block 1530, the third signal may be received by, for example, a processor.

At block 1540, a position of an object with respect to the display may be determined. The position determination may be performed by the processor, based on the received third signal.

At block 1550, the display and/or an electronic device associated with the display may be controlled, responsive to the position determination. For example, the processor may recognize, as a result of the position determination, a user input. Further, the processor may be configured to cause an image displayed on the display to be scrolled up or down, rotated, enlarged, or otherwise modified, responsive to the user input. Alternatively, or in addition, the processor may be configured to control other aspects of the electronic device, responsive to the user input. For example, the processor may be configured to change a volume setting, power off the electronic device, place or terminate a call, launch or terminate a software application, etc., responsive to the user input.

Figure 16A:
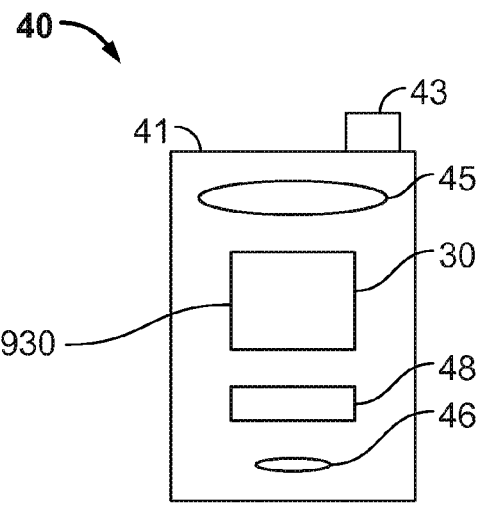
FIGS. 16A and 16B show examples of system block diagrams illustrating a display device that includes a plurality of IMODs.
Figure 16B:
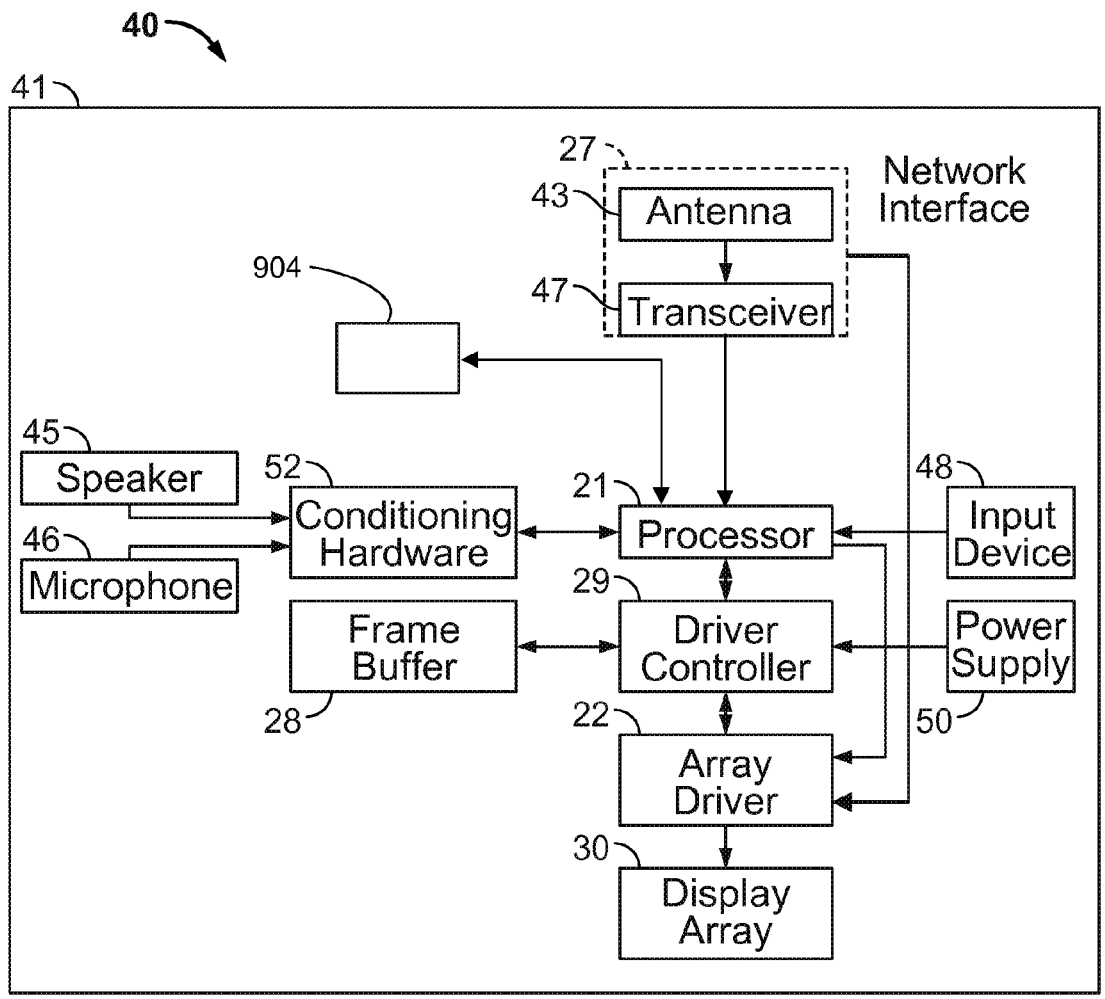

FIGS. 16A and 16B show examples of system block diagrams illustrating a display device 40 that includes arrangement 930 for gesture recognition. The display device 40 can be, for example, a smart phone, a cellular or mobile telephone. However, the same components of the display device 40 or slight variations thereof are also illustrative of various types of display devices such as televisions, tablets, e-readers, hand-held devices and portable media players.

The display device 40 includes a housing 41, a display 30, arrangement 930, an antenna 43, a speaker 45, an input device 48 and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an IMOD display, as described herein. The arrangement 930 may be configured substantially as described herein above.

The components of the display device 40 are schematically illustrated in FIG. 16B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. In some implementations, a power supply 50 can provide power to substantially all components in the particular display device 40 design.

In this example, the display device 40 also includes processor 904, which may be configured for communication with arrangement 930 via, for example, routing wires, and may be configured for controlling the electronic device 900. In the illustrated implementation, processor 904 is shown separately from, for example processor 21 and drive controller 29. It will be appreciated, however, that the functionality of processor 904, as discussed herein above, may be incorporated into processor 21 and/or drive controller 29, or, as further example, into a host processor (not shown). Processor 904 may be configured to recognize, from signals received from arrangement 930, an instance of a user touch or gesture. Processor 904 may then control display array 30 responsive to the user gesture. The network interface 27 includes the antenna 43 and the transceiver 47 so that the display device 40 can communicate with one or more devices over a network. The network interface 27 also may have some processing capabilities to relieve, for example, data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g, n, and further implementations thereof. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, in some implementations, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (such as an IMOD controller). Additionally, the array driver 22 can be a conventional driver or a bi-stable display driver (such as an IMOD display driver). Moreover, the display array 30 can be a conventional display array or a bi-stable display array (such as a display including an array of IMODs). In some implementations, the driver controller 29 can be integrated with the array driver 22. Such an implementation can be useful in highly integrated systems, for example, mobile phones, portable electronic devices, watches or small-area displays.

In some implementations, the input device 48 can be configured to allow, for example, a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40.

In some implementations, voice commands through the microphone 46 can be used for controlling operations of the display device 40.

The power supply 50 can include a variety of energy storage devices. For example, the power supply 50 can be a rechargeable battery, such as a nickel-cadmium battery or a lithium-ion battery. In implementations using a rechargeable battery, the rechargeable battery may be chargeable using power coming from, for example, a wall socket or a photovoltaic device or array. Alternatively, the rechargeable battery can be wirelessly chargeable. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other possibilities or implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of an IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, a person having ordinary skill in the art will readily recognize that such operations need not be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
   at least one channel waveguide configured for use with an interactive display having a user interface surface that includes a viewing area, wherein at least a portion of the channel waveguide is disposed within the viewing area, proximate to and substantially parallel to the user interface surface, the at least one channel waveguide being configured to propagate light or other electromagnetic energy in an evanescent state;
   a source of a first signal input to the channel waveguide; and
   at least one detector configured to receive, from the channel waveguide, a second signal corresponding to the first signal, and to output to a processor a third signal indicative of a position of an object proximate to or in contact with the channel waveguide, wherein
      the channel waveguide is configured to receive the light or other electromagnetic energy from the source, and has a longitudinal axis, dimensions of the channel waveguide transverse to the longitudinal axis being approximately equal to a wavelength of the light or other electromagnetic energy; and
      the light or other electromagnetic energy in the evanescent state is optically coupled with the object.

2. The apparatus of claim 1, wherein the at least one channel waveguide is disposed in a serpentine or spiral configuration.

3. The apparatus of claim 1, wherein the at least one channel waveguide includes a plurality of channel waveguides forming a network of waveguides.

4. The apparatus of claim 3, wherein each channel waveguide is substantially straight and parallel.

5. The apparatus of claim 4, wherein the plurality of channel waveguides is disposed in a rectilinear grid.

6. The apparatus of claim 3, wherein at least one channel waveguide is curved, non-parallel to at least one other channel waveguide in the network, or both.

7. The apparatus of claim 1, wherein:
   the channel waveguide includes at least one light turning device that outputs reflected light, in a direction having a substantial component orthogonal to the user interface surface, by reflecting emitted light received from the source;
   the source of the first signal is scattered light resulting from interaction of the reflected light with an object and the channel waveguide is configured to collect the scattered light;
   the light turning device redirects the collected scattered light toward the at least one detector;
   the second signal includes collected scattered light received by the at least one detector; and
   the third signal is indicative of an instance of a user gesture.

8. The apparatus of claim 7, wherein the light turning device includes one or more of a microstructure or a grating.

9. The apparatus of claim 1, wherein the first signal includes only scattered light received by the channel waveguide from the object, the scattered light resulting from interaction of the object with one or more of ambient light and a display light.

10. The apparatus of claim 1, further comprising a light-emitting source disposed outside the periphery of the viewing area, the light-emitting source being optically coupled with an input to the channel waveguide.

11. The apparatus of claim 1, wherein the interactive display is flexible.

12. The apparatus of claim 1, further comprising the interactive display, the interactive display including the user interface surface, and a processor configured to receive the third signal, and determine, from the third signal, a position of an object proximate to the channel waveguide, wherein the processor is configured to control one or both of the interactive display and an electronic device associated with the display, responsive to the position determination.

13. The apparatus of claim 12, wherein the processor is configured to determine the position of the object based, at least in part, on fly time of the signal.

14. The apparatus of claim 12, further comprising:
a driver circuit configured to send at least one signal to the interactive display; and
a controller configured to send at least a portion of the image data to the driver circuit.

15. The apparatus of claim 12, wherein the processor is configured to process image data, and the apparatus further includes a memory device that is configured to communicate with the processor.

16. The apparatus of claim 12, further including an image source module configured to send the image data to the processor, wherein the image source module includes one or more of a receiver, transceiver, and transmitter.

17. The apparatus of claim 12, further comprising:
an input device configured to receive input data and to communicate the input data to the processor.

* * * * *